US012286831B2

(12) United States Patent
Kim et al.

(10) Patent No.: US 12,286,831 B2
(45) Date of Patent: Apr. 29, 2025

(54) VEHICLE HINGE DRIVING APPARATUS

(71) Applicants: Hyundai Motor Company, Seoul (KR); Kia Corporation, Seoul (KR); PHA Co., Ltd., Daegu (KR); Keyang Electric Machinery Co., Ltd., Seoul (KR)

(72) Inventors: Duck Young Kim, Hwaseong-si (KR); Jae Man Cho, Incheon (KR); Byung Ju Kang, Ansan-si (KR); Seung Yup Lee, Siheung-si (KR); Kwang Hun Hong, Daegu (KR)

(73) Assignees: Hyundai Motor Company, Seoul (KR); Kia Corporation, Seoul (KR); PHA Co., Ltd., Daegu (KR); Keyang Electric Machinery Co., Ltd., Seoul (KR)

( * ) Notice: Subject to any disclaimer, the term of this patent is extended or adjusted under 35 U.S.C. 154(b) by 435 days.

(21) Appl. No.: 17/846,212

(22) Filed: Jun. 22, 2022

(65) Prior Publication Data

US 2023/0114968 A1 Apr. 13, 2023

(30) Foreign Application Priority Data

Oct. 12, 2021 (KR) ........................ 10-2021-0135104

(51) Int. Cl.
*E05F 15/624* (2015.01)
*E05F 5/02* (2006.01)
*E05F 15/614* (2015.01)

(52) U.S. Cl.
CPC ............ *E05F 5/022* (2013.01); *E05F 15/614* (2015.01); *E05F 15/624* (2015.01); *E05Y 2201/21* (2013.01); *E05Y 2201/674* (2013.01); *E05Y 2900/531* (2013.01)

(58) Field of Classification Search
CPC .. Y02T 10/62; B60K 17/046; B60K 23/0808; B60K 6/365; B60K 6/387; B60K 6/445; B60T 13/741; B60T 13/74; B60T 13/746
See application file for complete search history.

(56) References Cited

U.S. PATENT DOCUMENTS 3,554,094 A 1/1971 Gross
6,336,294 B1 1/2002 Kowalczyk et al.
7,028,573 B2 4/2006 Inaba et al.
7,147,267 B2 12/2006 Bittner et al.
(Continued)

FOREIGN PATENT DOCUMENTS

CN 104968880 A 10/2015
CN 103228857 B 5/2016
(Continued)

OTHER PUBLICATIONS

CN_113446826_A Translation (Year: 2021).*
(Continued)

*Primary Examiner* — Bryan R Perez
(74) *Attorney, Agent, or Firm* — Slater Matsil, LLP

(57) ABSTRACT

An embodiment vehicle hinge driving apparatus includes an actuator, a housing connected to the actuator, an output shaft having an axis aligned with an axis of the housing, a transmission mechanism configured to transmit a torque from the actuator to the output shaft, and a brake unit configured to provide a brake torque to the output shaft.

17 Claims, 21 Drawing Sheets

(56) References Cited

U.S. PATENT DOCUMENTS

| | | | |
|---|---|---|---|
| 7,690,709 | B2 | 4/2010 | Barral et al. |
| 8,585,124 | B2 | 11/2013 | Oberle et al. |
| 9,062,488 | B2 * | 6/2015 | Sasaki .................. E05F 15/611 |
| 10,190,354 | B2 | 1/2019 | Kummer |
| 2002/0180233 | A1 | 12/2002 | Benthaus et al. |
| 2003/0097793 | A1 | 5/2003 | Kowalczyk et al. |
| 2003/0219305 | A1 | 11/2003 | Chen |
| 2006/0082186 | A1 | 4/2006 | Bals |
| 2012/0152047 | A1 | 6/2012 | Hu |
| 2012/0233925 | A1 | 9/2012 | Linnenkohl |
| 2013/0199321 | A1 | 8/2013 | Oberle et al. |
| 2014/0373454 | A1 | 12/2014 | Sasaki |
| 2015/0315838 | A1 | 11/2015 | Kummer |
| 2018/0209201 | A1 | 7/2018 | Schimon |
| 2018/0216384 | A1 | 8/2018 | Rietdijk |
| 2019/0032387 | A1 | 1/2019 | Wolker |
| 2021/0140516 | A1 | 5/2021 | Gong et al. |
| 2023/0112987 | A1 | 4/2023 | Kim |
| 2024/0102331 | A1 | 3/2024 | Knopp |

FOREIGN PATENT DOCUMENTS

| | | | | |
|---|---|---|---|---|
| CN | 109882013 | A | | 6/2019 |
| CN | 113446826 | A | * | 9/2021 |
| DE | 60028876 | T2 | | 11/2006 |
| KR | 20120042325 | A | | 5/2012 |

OTHER PUBLICATIONS

United States Patent and Trademark Office, Office Action received in related U.S. Appl. No. 17/846,270, filed Sep. 27, 2023, 21 pages.

* cited by examiner

VEHICLE HINGE DRIVING APPARATUS

CROSS-REFERENCE TO RELATED APPLICATIONS

This application claims the benefit of Korean Patent Application No. 10-2021-0135104, filed on Oct. 12, 2021, which application is hereby incorporated herein by reference.

TECHNICAL FIELD

The present disclosure relates to a vehicle hinge driving apparatus.

BACKGROUND

A vehicle includes a door component such as a tailgate, a vehicle door, or a trunk lid, and a vehicle hinge mounted between the door component and a vehicle body. The door component may pivot on the vehicle hinge.

The vehicle hinge includes a hinge bracket, and a hinge arm pivotable around the hinge bracket through a hinge pin. The hinge bracket may be mounted on the vehicle body through fasteners and/or the like, and the hinge arm may be mounted on the door component through fasteners and/or the like. As the hinge arm pivots around the hinge pin, the door component may be opened and closed.

The door component may be divided into a manual door component which is driven manually by a user, and an electric door component which is driven by an actuator such as a motor. In particular, the electric door component includes a vehicle hinge driving apparatus for driving the hinge arm of the vehicle hinge, and the vehicle hinge driving apparatus may be directly connected to the hinge arm. As the hinge arm pivots by the vehicle hinge driving apparatus, the electric door component may be opened and closed.

The vehicle hinge driving apparatus according to the related art may be configured to transmit a torque of a drive motor to the vehicle hinge through a geartrain including a helical gear, a worm, and a wheel gear. In particular, since the geartrain in the related art vehicle hinge driving apparatus has a complex structure including the helical gear, the worm, and the wheel gear, it may have a plurality of rotation axes perpendicular to each other, and accordingly a direction of transmission of power (or a torque) may be changed several times (e.g., four times), and the volume or size of the vehicle hinge driving apparatus may relatively increase. Since the vehicle hinge driving apparatus has a relatively large volume or size, it may take up a relatively large space of the vehicle adjacent to the vehicle hinge, causing a significant loss of space in compartments adjacent to the door component. For example, when the related art vehicle hinge driving apparatus is connected to the vehicle hinge of the trunk lid, the vehicle hinge driving apparatus having a relatively large volume may extend into a trunk compartment adjacent to the vehicle hinge of the trunk lid. When the related art vehicle hinge driving apparatus is connected to the vehicle hinge of the tailgate, the vehicle hinge driving apparatus having a relatively large volume may extend into a headroom. When the related art vehicle hinge driving apparatus is connected to the vehicle hinge of the vehicle door, the vehicle hinge driving apparatus having a relatively large volume may take up a relatively large space in the vehicle door and interfere with a glass movement path in the vehicle door.

In addition, forward driving of the related art vehicle hinge driving apparatus may be smoothly performed using a frictional force between the gears, but reverse driving thereof may not be smoothly performed. The forward driving of the related art vehicle hinge driving apparatus may be performed by forward rotation of the drive motor, and the reverse driving thereof may be performed by reverse rotation of the drive motor.

In particular, the related art vehicle hinge driving apparatus may not include a brake unit, and accordingly it may be difficult to maintain an open state of the door component.

The above information described in this background section is provided to assist in understanding the background of the inventive concept, and may include any technical concept which is not considered as the prior art that is already known to those skilled in the art.

SUMMARY

The present disclosure relates to a vehicle hinge driving apparatus. Particular embodiments relate to a vehicle hinge driving apparatus for driving a vehicle hinge mounted between a door component (a tailgate, a vehicle door, a trunk lid, or the like) and a vehicle body, and more particularly, to a vehicle hinge driving apparatus including a brake unit capable of stably maintaining an open state of the door component.

Embodiments of the present disclosure can solve problems occurring in the prior art while advantages achieved by the prior art are maintained intact.

An embodiment of the present disclosure provides a vehicle hinge driving apparatus including a brake unit capable of stably maintaining an open state of a door component.

According to an embodiment of the present disclosure, a vehicle hinge driving apparatus for driving a vehicle hinge mounted between a door component and a vehicle body may include an actuator, a housing connected to the actuator, an output shaft having an axis aligned with an axis of the housing, a transmission mechanism transmitting a torque from the actuator to the output shaft, and a brake unit providing a brake torque to the output shaft.

The vehicle hinge driving apparatus may be integrally formed with the brake unit so that the brake torque may be generated while the output shaft is rotating. As the brake torque is provided to the output shaft, the open state of the door component connected to the output shaft through the vehicle hinge may be stably maintained by the brake torque. Specifically, when the door component is opened, the brake unit may provide the brake torque to the output shaft, and thus the door component may be prevented from being closed by its own weight.

The brake unit may include a first friction disk mounted on the output shaft, and a second friction disk mounted on the housing, and the first friction disk may contact the second friction disk.

The brake unit may generate the brake torque using a frictional force between the first friction disk and the second friction disk. When the actuator does not operate, the output shaft may be stopped in a predetermined position. As the brake torque is provided to the output shaft, the output shaft may be stably maintained in the stopped position.

The brake unit may further include a spring providing a spring force to maintain a contact between the first friction disk and the second friction disk.

As the contact between the first friction disk and the second friction disk is maintained by the spring, the brake torque may be reliably generated.

The first friction disk and the second friction disk may be made of different materials.

Accordingly, a relatively large frictional force may be generated between the first friction disk and the second friction disk. For example, the first friction disk may be made of a synthetic resin material such as plastic, and the second friction disk may be made of a metal material such as steel.

The output shaft may include a flange facing the transmission mechanism, and the spring may apply the spring force to push the first friction disk and the second friction disk against the flange of the output shaft.

Accordingly, the first and second friction disks may be maintained in a tight contact state between the spring and the flange of the output shaft.

The spring may be held by a first spring holder and a second spring holder, the first spring holder may be adjacent to the first friction disk and the second friction disk, the second spring holder may be far from the first friction disk and the second friction disk, and the spring may be interposed between the first spring holder and the second spring holder.

As the spring is stably held by the first spring holder and the second spring holder, the spring may be able to stably maintain the contact between the first friction disk and the second friction disk.

The housing may have a plurality of inner recesses provided in an inner circumferential surface thereof, the first spring holder may have a plurality of first projections provided on an outer circumferential surface thereof, and the second spring holder may have a plurality of second projections provided on an outer circumferential surface thereof. The first projections of the first spring holder may be fitted into the inner recesses of the housing, respectively, and the second projections of the second spring holder may be fitted into the inner recesses of the housing, respectively.

Accordingly, the first spring holder and the second spring holder may be fixedly mounted on the inner circumferential surface of the housing, and the spring may be stably held with respect to the housing by the first spring holder and the second spring holder.

The output shaft may have a plurality of first projections and a plurality of first recesses alternately arranged in a circumferential direction thereof, and the first friction disk may have a plurality of first recesses and a plurality of first projections alternately arranged on an inner circumferential surface thereof. The first projections of the first friction disk may be fitted into the first recesses of the output shaft, respectively, and the first projections of the output shaft may be fitted into the first recesses of the first friction disk, respectively.

Accordingly, the first friction disk may be fixedly mounted on an outer circumferential surface of the output shaft, and the first friction disk may rotate together with the output shaft in the same direction.

The housing may have a plurality of inner recesses provided in an inner circumferential surface thereof, the second friction disk may have a plurality of second projections provided on an outer circumferential surface thereof, and the second projections of the second friction disk may be fitted into the inner recesses of the housing, respectively.

Accordingly, the second friction disk may be fixedly mounted on the inner circumferential surface of the housing. That is, as the second friction disk is fixed to the housing and the first friction disk rotates together with the output shaft, a relatively large frictional force may be generated between the first friction disk and the second friction disk.

The vehicle hinge driving apparatus may further include a hinge rod connected to the output shaft, and the hinge rod may extend in a direction perpendicular to the axis of the output shaft.

The hinge rod may have a through hole through which the output shaft extends, the hinge rod may have a plurality of recesses and a plurality of projections alternately arranged on an inner circumferential surface of the through hole in a circumferential direction thereof, and the output shaft may have a plurality of second projections and a plurality of second recesses alternately arranged in a circumferential direction thereof. The second projections of the output shaft may be fitted into the recesses of the hinge rod, respectively, and the projections of the hinge rod may be fitted into the second recesses of the output shaft, respectively.

As the hinge rod and the output shaft are coupled by serration coupling, the output shaft may be prevented from slipping in the through hole of the hinge rod in a rotation direction.

The output shaft may have an annular recess extending in the circumferential direction thereof, and the annular recess may be provided in the second projections of the output shaft in the circumferential direction.

As a snap ring is fit into the annular recess, the hinge rod may be firmly mounted to the output shaft.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
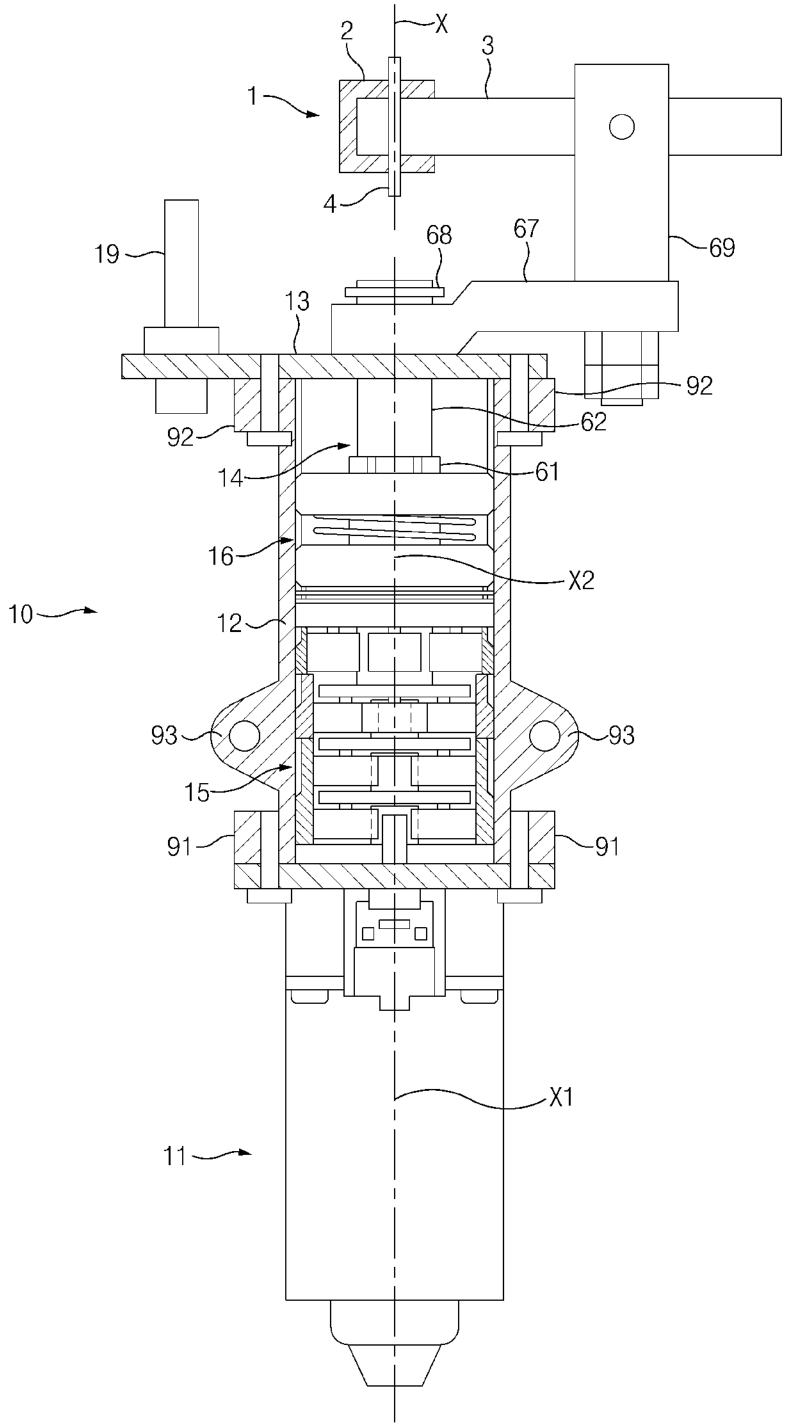
FIG. 1 illustrates a vehicle hinge driving apparatus according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with embodiments of the present disclosure will be omitted in order not to unnecessarily obscure the gist of embodiments of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle hinge driving apparatus 10 according to an exemplary embodiment of the present disclosure may be directly connected to a vehicle hinge 1 to drive the vehicle hinge 1. The vehicle hinge 1 may include a hinge bracket 2, and a hinge arm 3 pivotally connected to the hinge bracket 2 through a hinge pin 4. The hinge bracket 2 may be mounted on a portion of a vehicle body adjacent to an opening of the vehicle body through fasteners and/or the like, and the hinge arm 3 may be mounted on a door component through fasteners and/or the like. The hinge arm 3 may pivot (rotate) on an axis X of the hinge pin 4.

Referring to FIG. 1, the vehicle hinge driving apparatus 10 according to an exemplary embodiment of the present disclosure may include an actuator 11, a housing 12 connected to the actuator 11, an output shaft 14 having an axis aligned with an axis X2 of the housing 12, a transmission mechanism 15 transmitting a torque from the actuator 11 to the output shaft 14, and a brake unit 16 mounted in the output shaft 14.

The actuator 11 may be connected to the vehicle hinge 1 through the transmission mechanism 15 and the output shaft 14. The actuator 11 may be a drive motor. In particular, the actuator 11 may be a bidirectional motor rotatable in both directions.

Figure 2:
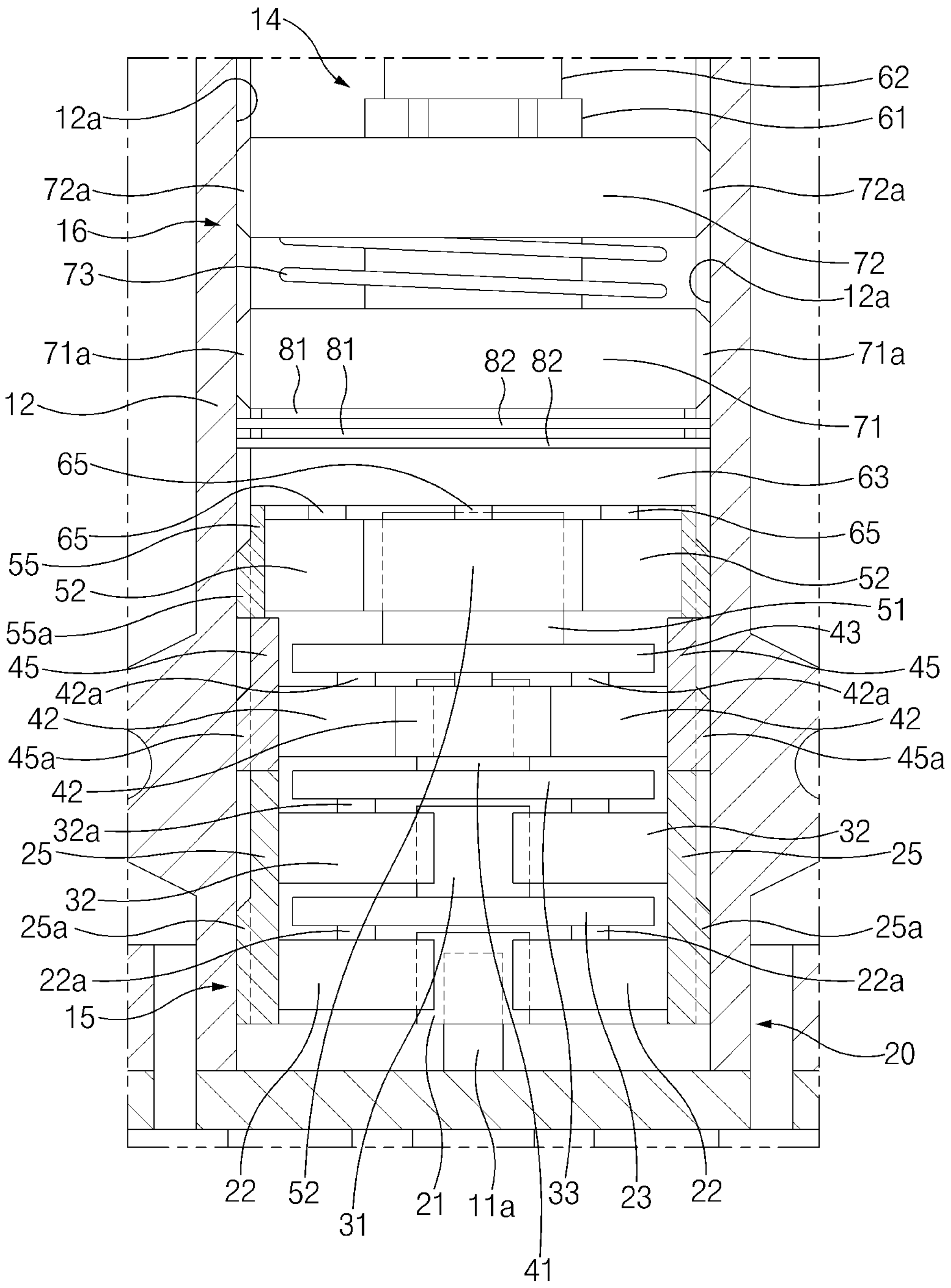
FIG. 2 illustrates an enlarged view of a transmission mechanism and a brake unit of the vehicle hinge driving apparatus illustrated in FIG. 1.

The actuator 11 may include an actuator shaft **11*a* operatively connected to the transmission mechanism 15. The actuator 11 may generate a torque around an axis X1 of the actuator shaft 11*a*. Referring to FIG. 2, a proximal sun gear 21 which is a drive gear may be fixed to the actuator shaft 11*a* of the actuator 11, and the torque of the actuator 11 may be transmitted to the transmission mechanism 15 through the actuator shaft 11*a* and the proximal sun gear 21**.

The housing 12 may include a cavity defined therein, and the transmission mechanism 15 and the output shaft 14 may be received in the cavity of the housing 12. The housing 12 may have a first open end in which the actuator 11 is mounted, and a second open end in which a cover 13 is mounted. The cover 13 may have a through hole through which the output shaft 14 extends, and an outer end portion of the output shaft 14 may protrude from the cover 13 toward the vehicle hinge 1 through the through hole of the cover 13. For example, the housing 12 may be manufactured by die casting.

Figure 17:
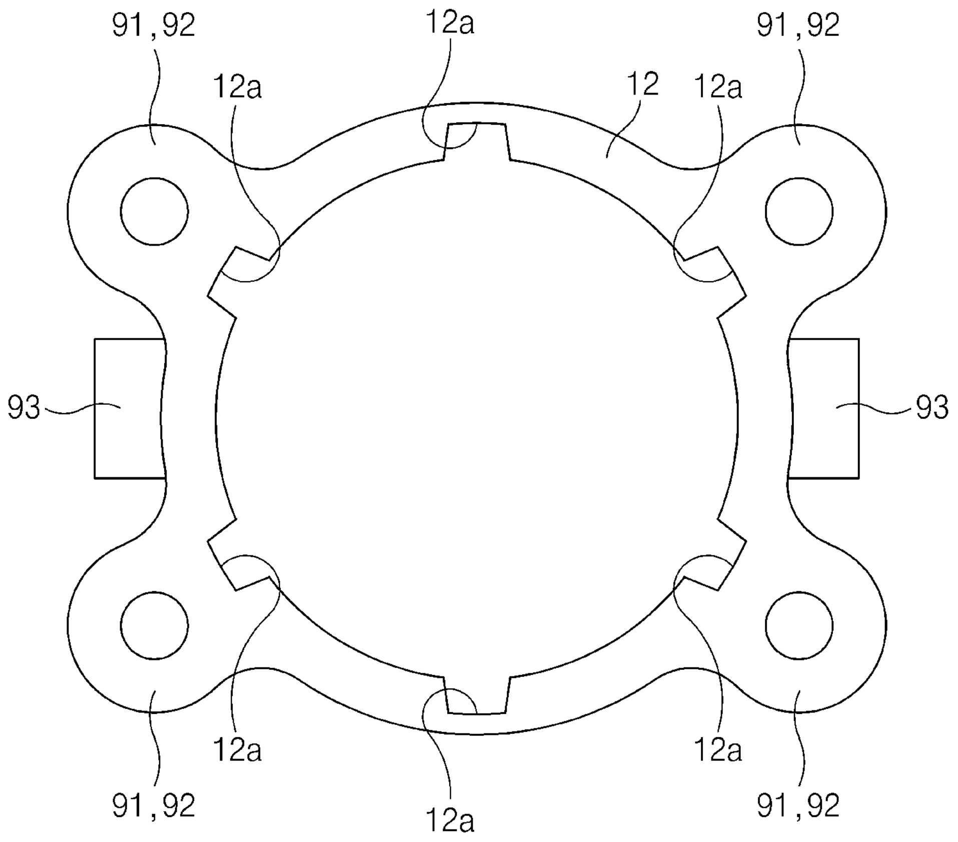
FIG. 17 illustrates a plan view of a housing of a vehicle hinge driving apparatus according to an exemplary embodiment of the present disclosure.

Referring to FIGS. 2 and 17, the housing 12 may have a plurality of inner recesses **12*a* in an inner circumferential surface thereof, and the plurality of inner recesses 12*a* may be spaced apart from each other in a circumferential direction thereof. The plurality of inner recesses 12*a* may be recessed from the inner circumferential surface of the housing 12 toward an outer circumferential surface of the housing 12 in a radial direction, and each inner recess 12*a* may extend in a longitudinal direction of the housing 12**.

Figure 18:
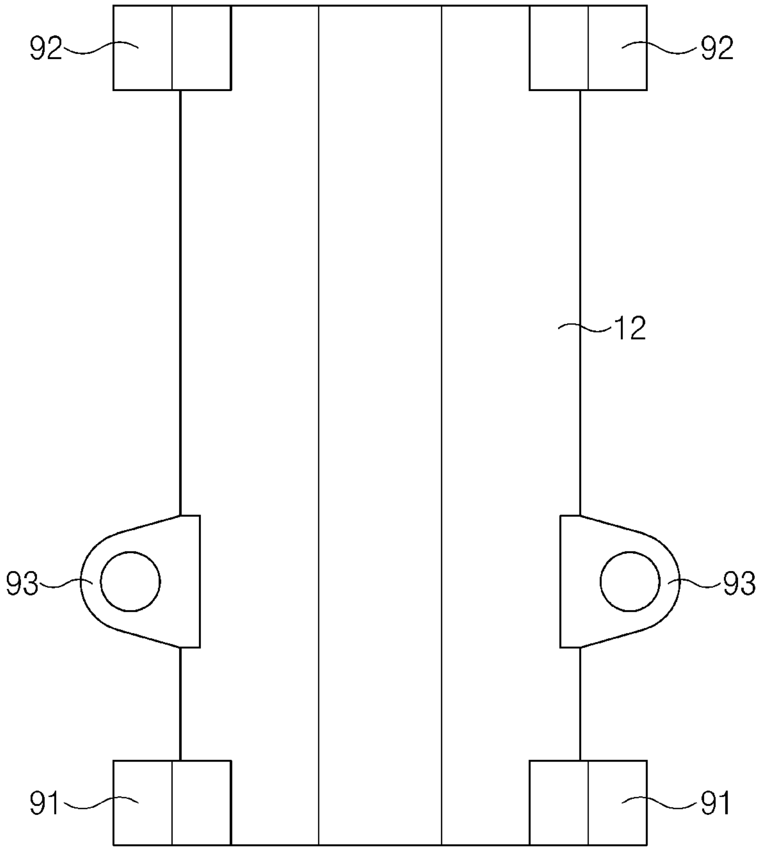
FIG. 18 illustrates a side view of a housing of a vehicle hinge driving apparatus according to an exemplary embodiment of the present disclosure.

Referring to FIG. 18, the housing 12 may include a plurality of first end mounting lugs 91 adjacent to the first open end thereof, a plurality of second end mounting lugs 92 adjacent to the second open end thereof, and a plurality of side mounting lugs 93 provided on a lateral surface thereof.

Referring to FIG. 1, the actuator 11 may be joined to the first end mounting lugs 91 of the housing 12 through fasteners, and the cover 13 may be joined to the second end mounting lugs 92 of the housing 12 through fasteners. The side mounting lugs 93 of the housing 12 may be mounted on the vehicle body or the door component through fasteners.

The output shaft 14 may extend from the transmission mechanism 15 in the housing 12, and the output shaft 14 may extend through the cover 13. The axis of the output shaft 14 may be aligned with the axis X2 of the housing 12, and the output shaft 14 may connect the transmission mechanism 15 and the hinge arm 3 of the vehicle hinge 1.

Accordingly, the output shaft 14 may transmit the torque received from the transmission mechanism 15 to the vehicle hinge 1.

Figure 10:
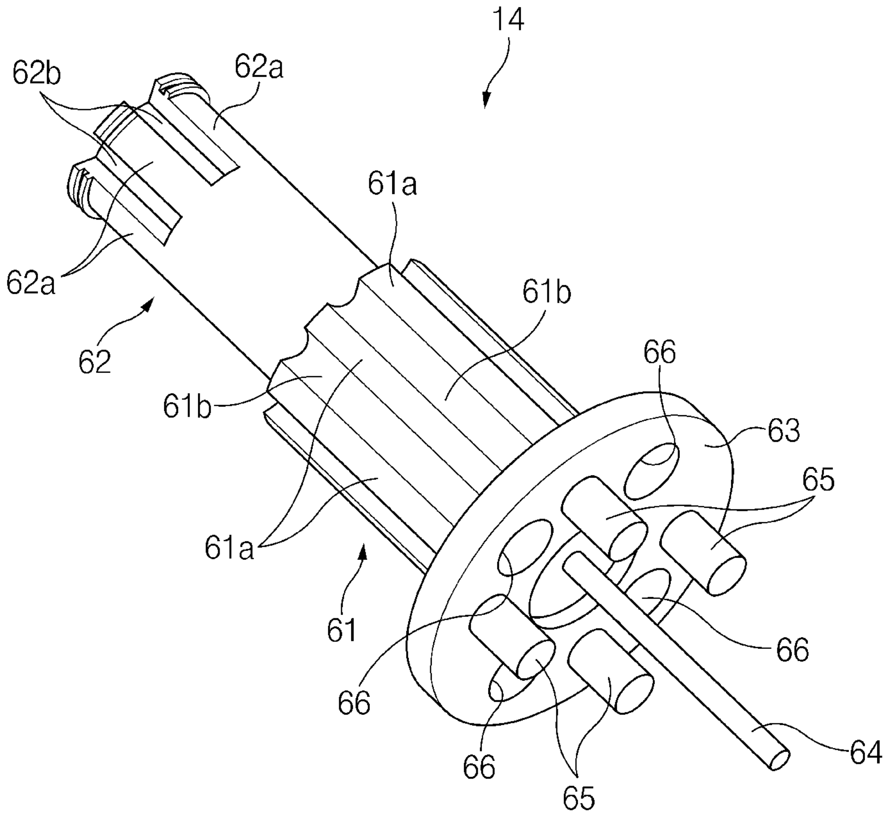
FIG. 10 illustrates a perspective view of an output shaft of a vehicle hinge driving apparatus according to an exemplary embodiment of the present disclosure.

Referring to FIG. 10, the output shaft 14 may include a first shaft 61 and a second shaft 62 connected to the first shaft 61. An outer diameter of the first shaft 61 may be greater than that of the second shaft 62.

The first shaft 61 may include a plurality of first projections 61*a* and a plurality of first recesses 61*b* alternately arranged in a circumferential direction thereof, and each first projection 61*a* and each first recess 61*b* may extend in a longitudinal direction of the first shaft 61.

The second shaft 62 may include a plurality of second projections 62*a* and a plurality of second recesses 62*b* alternately arranged in a circumferential direction thereof, and each second projection 62*a* and each second recess 62*b* may extend in a longitudinal direction of the second shaft 62. The second shaft 62 may extend through the cover 13, and an outer end portion of the second shaft 62 may protrude from the cover 13.

The output shaft 14 may include a flange 63 facing the transmission mechanism 15. In particular, the flange 63 may be fixed to the first shaft 61.

Figure 11:
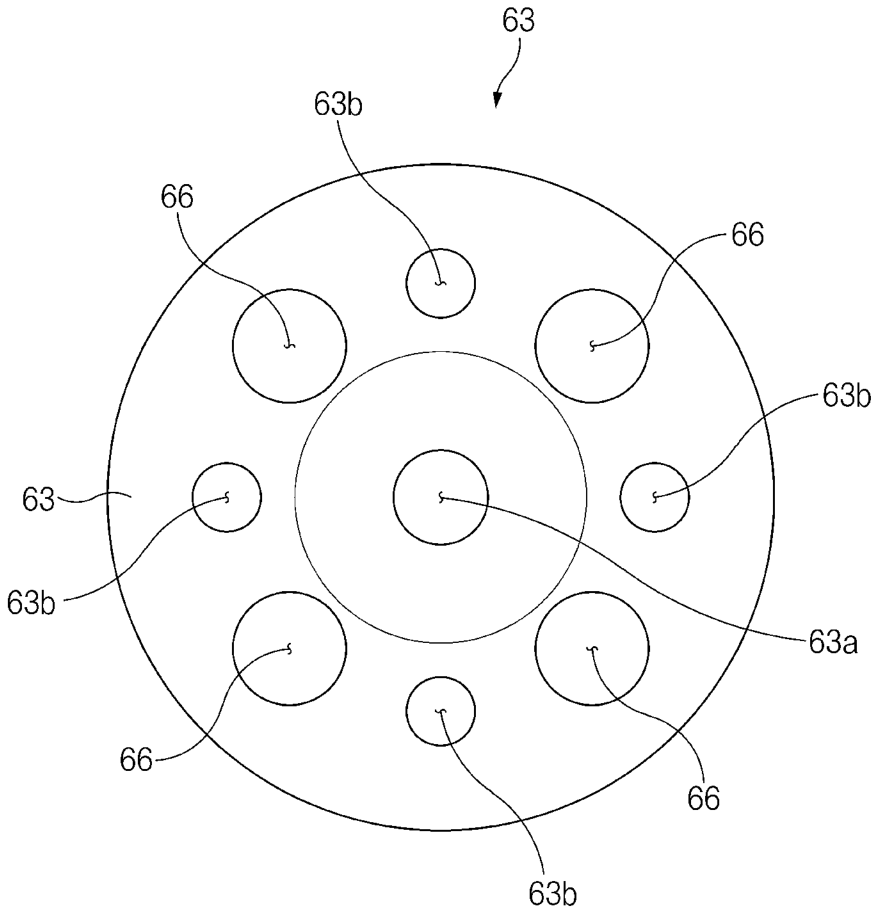
FIG. 11 illustrates a flange of the output shaft illustrated in FIG. 10.

Referring to FIG. 11, the flange 63 may include a center hole 63*a* provided in the center thereof, a plurality of first mounting holes 63*b* arranged around the center hole 63*a*, and a plurality of second mounting holes 66 alternated with the plurality of first mounting holes 63*b*. A support pin 64 may be fitted into the center hole 63*a*, and a plurality of pins 65 of a distal gear set may be fitted into the plurality of first mounting holes 63*b*. As a plurality of fasteners are fastened to the plurality of second mounting holes 66, respectively, the flange 63 may be fixed to the first shaft 61 of the output shaft 14.

Figure 19:
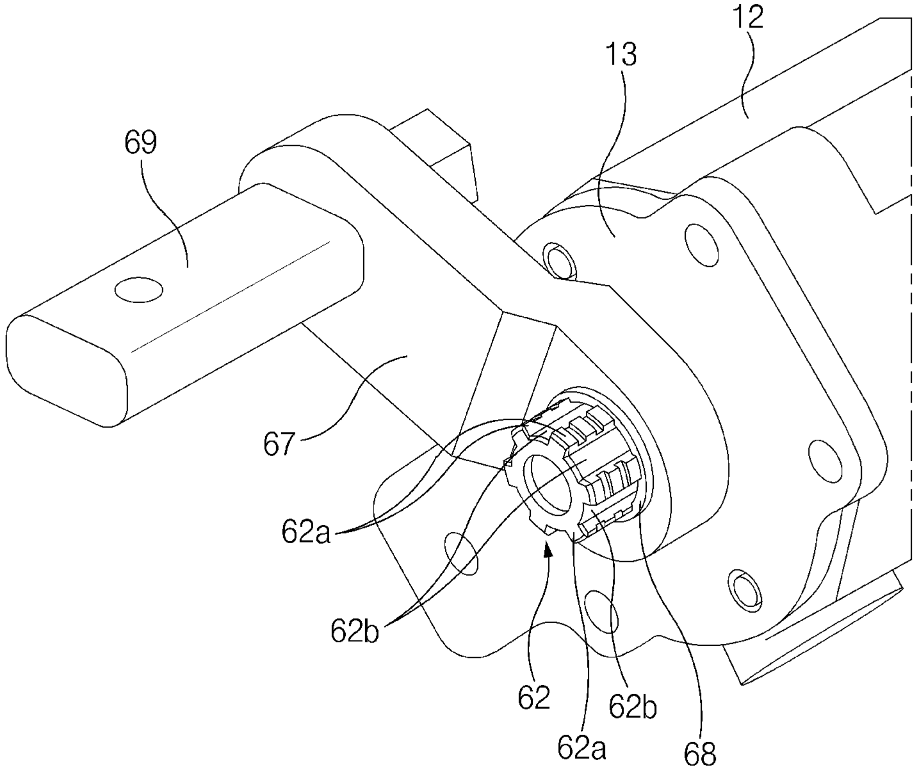
FIG. 19 illustrates a perspective view of an output shaft, a hinge rod, and a hinge adapter in a vehicle hinge driving apparatus according to an exemplary embodiment of the present disclosure.

Referring to FIGS. 1 and 19, a hinge rod 67 may be coupled to the outer end portion of the second shaft 62 of the output shaft 14 through a snap ring 68, and the hinge rod 67 may extend in a direction perpendicular to an axis of the second shaft 62 of the output shaft 14. A hinge adapter 69 may be fixed to the hinge rod 67, and the hinge adapter 69 may extend in a direction perpendicular to an axis of the hinge rod 67. The hinge adapter 69 and the hinge arm 3 of the vehicle hinge 1 may be joined through fasteners and/or the like.

Figure 20:
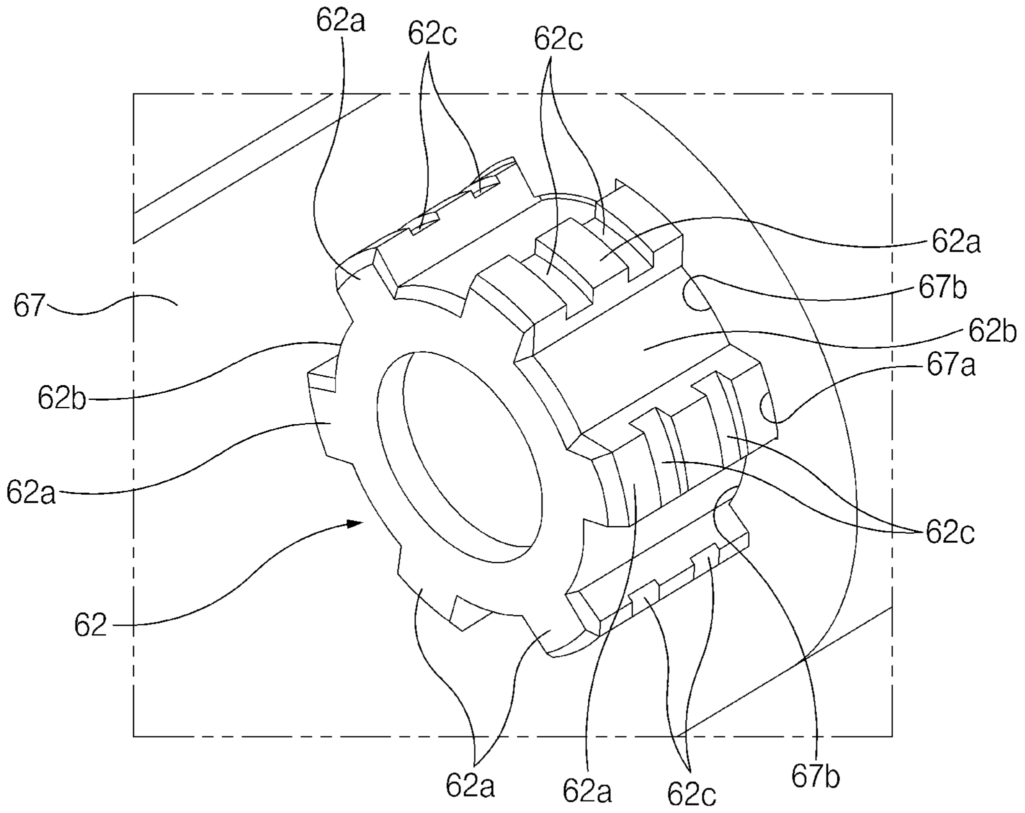
FIG. 20 illustrates a partial perspective view of a state in which an output shaft is coupled to a hinge rod in a vehicle hinge driving apparatus according to an exemplary embodiment of the present disclosure.

Referring to FIG. 20, the hinge rod 67 may have a through hole through which the end portion of the second shaft 62 of the output shaft 14 extends, and the hinge rod 67 may include a plurality of recesses 67*a* and a plurality of projections 67*b* alternately arranged on an inner circumferential surface of the through hole in a circumferential direction thereof. The second projections 62*a* of the second shaft 62 of the output shaft 14 may be fitted into the recesses 67*a* of the hinge rod 67, respectively, and the projections 67*b* of the hinge rod 67 may be fitted into the second recesses 62*b* of the second shaft 62 of the output shaft 14, respectively. As the hinge rod 67 and the second shaft 62 of the output shaft 14 are coupled by serration coupling, the second shaft 62 of the output shaft 14 may be prevented from slipping in the through hole of the hinge rod 67 in a rotation direction.

Figure 21:
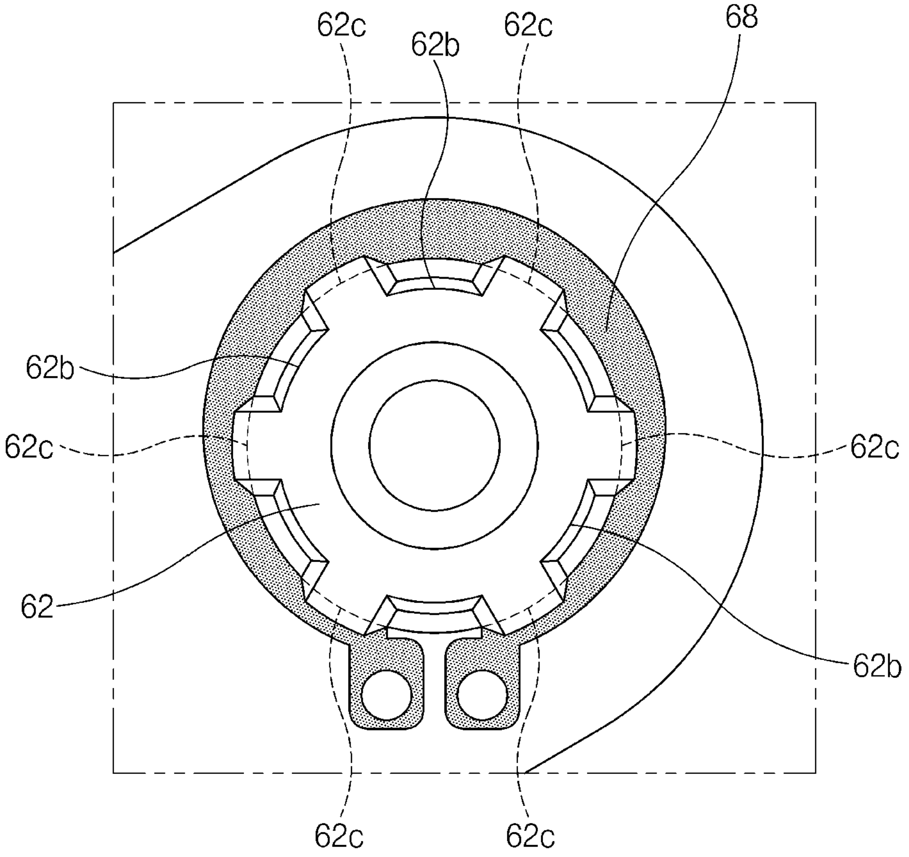
FIG. 21 illustrates a state in which an output shaft is coupled to a hinge rod through a snap ring in a vehicle hinge driving apparatus according to an exemplary embodiment of the present disclosure.

Referring to FIG. 20, the second shaft 62 of the output shaft 14 may include a plurality of annular recesses 62*c* extending in the circumferential direction thereof. The annular recesses 62*c* may be formed in the second projections 62*a* of the second shaft 62, and the plurality of annular recesses 62*c* may be spaced apart from each other in an axial direction of the second shaft 62. Referring to FIG. 21, the snap ring 68 may be fit into any one of the plurality of annular recesses 62*c* so that the hinge rod 67 may be fixedly mounted to the second shaft 62 of the output shaft 14.

Referring to FIG. 1, the vehicle hinge driving apparatus 10 according to an exemplary embodiment of the present disclosure may further include a restricting rod 19 mounted in the cover 13, and the restricting rod 19 may be mounted in a predetermined position of the cover 13 to restrict a rotation position of the hinge adapter 69.

Referring to FIG. 2, the brake unit 16 may be mounted in the output shaft 14 to provide a brake torque with respect to the output shaft 14. According to an exemplary embodiment, the brake unit 16 may be mounted in the first shaft 61 of the output shaft 14. In particular, the brake unit 16 may be tightly coupled to the flange 63 on the first shaft 61 of the output shaft 14.

Specifically, the brake unit 16 may include a plurality of friction disks 81 and 82 and a spring 73 providing a spring force to the plurality of friction disks 81 and 82.

The plurality of friction disks 81 and 82 may include one or more first friction disks 81 mounted on the first shaft 61 of the output shaft 14, and one or more second friction disks 82 mounted on the housing 12. The first friction disk 81 may tightly contact the second friction disk 82. Accordingly, a contact area between the first friction disk 81 and the second friction disk 82 may be sufficiently secured, and thus the first friction disk 81 and the second friction disk 82 may generate enough frictional force.

According to an exemplary embodiment, as the first friction disk 81 and the second friction disk 82 are made of different materials, a relatively large frictional force may be generated between the first friction disk 81 and the second friction disk 82. For example, the first friction disk 81 may be made of a synthetic resin material such as plastic, and the second friction disk 82 may be made of a metal material such as steel.

Figure 4:
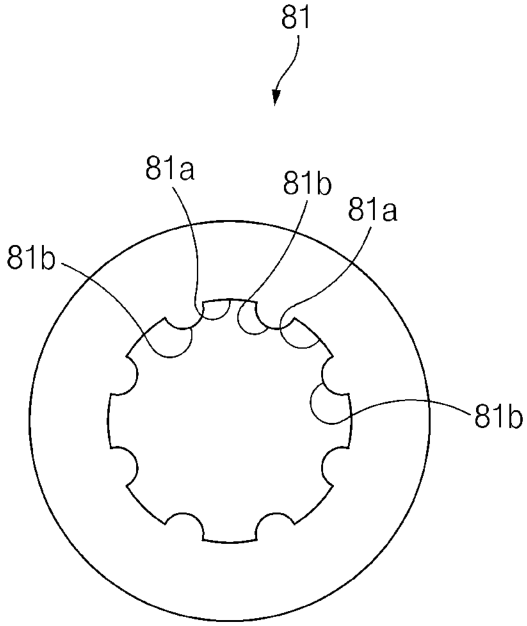
FIG. 4 illustrates a first friction disk of the brake unit illustrated in FIG. 3.
Figure 6:
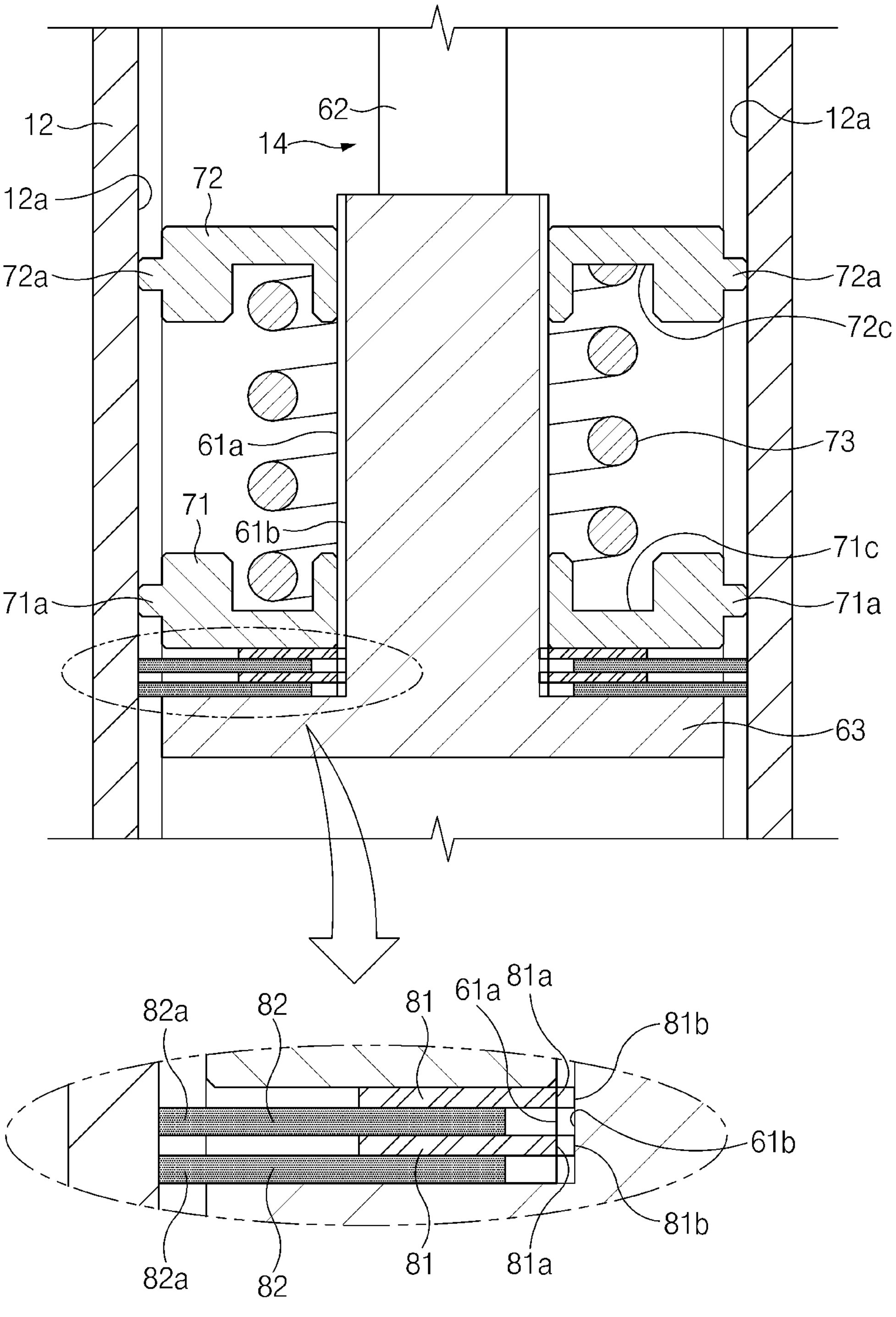
FIG. 6 illustrates a cross-sectional view of a brake unit of a vehicle hinge driving apparatus according to an exemplary embodiment of the present disclosure.

The first friction disk 81 may be an annular disk having an inner diameter corresponding to the outer diameter of the first shaft 61 of the output shaft 14. Referring to FIG. 4, the first friction disk 81 may include a plurality of first recesses 81*a* and a plurality of first projections 81*b* alternately arranged on an inner circumferential surface thereof. The plurality of first recesses 81*a* may be recessed from the inner circumferential surface of the first friction disk 81 to an outer circumferential surface thereof in a radial direction, and the plurality of first projections 81*b* may protrude from the inner circumferential surface of the first friction disk 81 toward the center of the first friction disk 81 in the radial direction. Referring to FIG. 6, the first projections 81*b* of the first friction disk 81 may be fitted into the first recesses 61*b* of the first shaft 61 of the output shaft 14, respectively, and the first projections 61*a* of the first shaft 61 of the output shaft 14 may be fitted into the first recesses 81*a* of the first friction disk 81, respectively, so that the first friction disk 81 may be fixedly mounted to the first shaft 61 of the output shaft 14. Thus, the first friction disk 81 may rotate with the output shaft 14 in the same direction.

Figure 5:
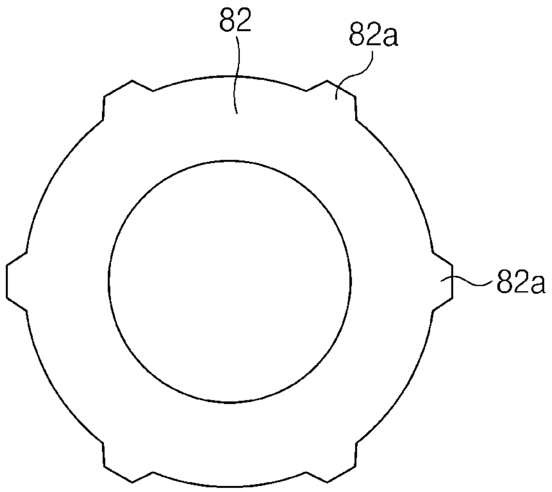
FIG. 5 illustrates a second friction disk of the brake unit illustrated in FIG. 3.

The second friction disk 82 may be an annular disk having an inner diameter corresponding to the outer diameter of the first shaft 61 of the output shaft 14. Referring to FIG. 5, the second friction disk 82 may include a plurality of second projections 82*a* protruding outwards from an outer circumferential surface thereof. Referring to FIG. 6, the second projections 82*a* of the second friction disk 82 may be fitted into the inner recesses 12*a* of the housing 12 so that the second friction disk 82 may be fixedly mounted on the inner circumferential surface of the housing 12.

Figure 3:
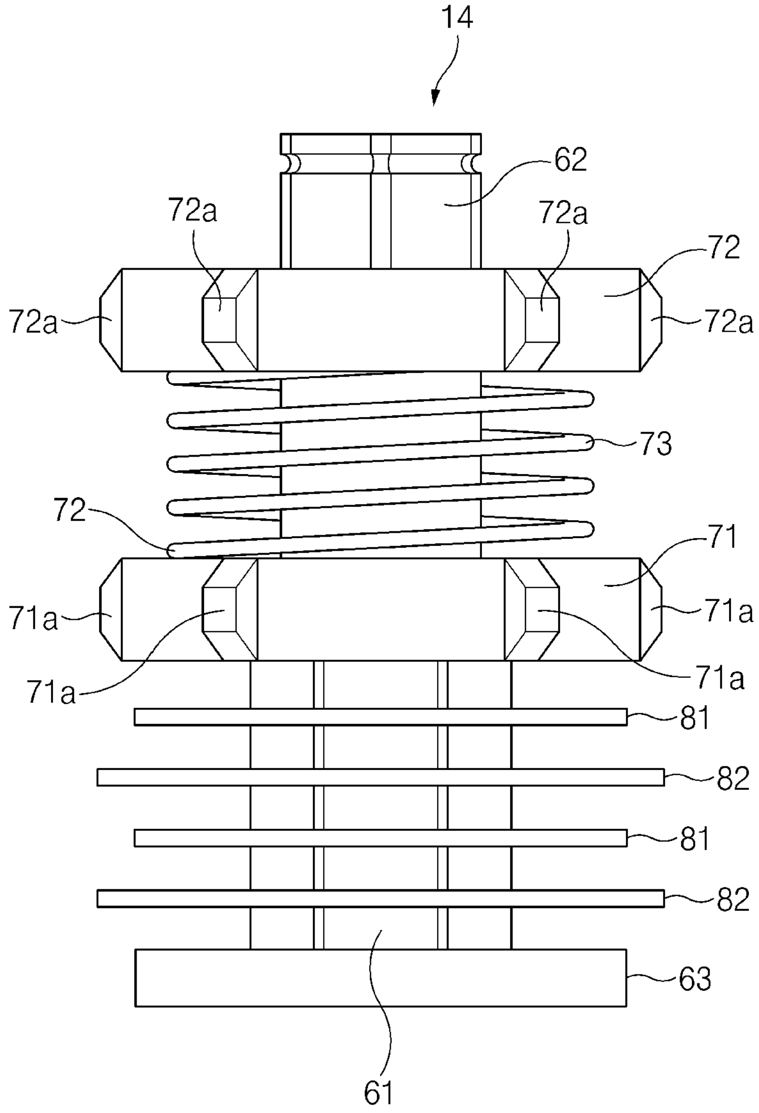
FIG. 3 illustrates a brake unit of a vehicle hinge driving apparatus according to an exemplary embodiment of the present disclosure.

According to an exemplary embodiment, the plurality of first friction disks 81 and the plurality of second friction disks 82 may be alternately arranged so that contact areas thereof may be increased, and accordingly a frictional force may be increased. Referring to FIGS. 2, 3, and 6, the two first friction disks 81 and the two second friction disks 82 may be alternately arranged.

As the output shaft 14 rotates using the torque received from the transmission mechanism 15, the first friction disk 81 may rotate together with the output shaft 14, and the second friction disk 82 may remain fixed to the housing 12. When the output shaft 14 rotates, a brake torque may be generated by friction between the first friction disk 81 and the second friction disk 82. When the actuator 11 does not operate, the output shaft 14 may be stopped in a predetermined position. As the brake unit 16 provides the brake torque to the output shaft 14, the output shaft 14 may be stably maintained in the stopped position. Specifically, an open state of the door component may be stably maintained by the brake torque generated through the friction between the first friction disk 81 and the second friction disk 82. That is, when the door component is in a fully open position, the brake unit 16 may provide the brake torque to the output shaft 14, and thus the door component may be prevented from being closed by its own weight.

The spring 73 may provide a spring force to maintain the contact between the first friction disk 81 and the second friction disk 82. Specifically, the spring 73 may provide an elastic force to push the first friction disk 81 and the second friction disk 82 against the flange 63 of the output shaft 14. Accordingly, the first and second friction disks 81 and 82 may be maintained in a tight contact state between the spring 73 and the flange 63 of the output shaft 14.

Referring to FIGS. 2, 3, and 6, the spring 73 may be stably held by a first spring holder 71 and a second spring holder 72. The first spring holder 71 may be adjacent to the plurality of friction disks 81 and 82, and the second spring holder 72 may be spaced apart from the first spring holder 71 in a longitudinal direction of the output shaft 14. The first spring holder 71 may be disposed to contact the first friction disk 81 among the plurality of friction disks 81 and 82, and the second spring holder 72 may be disposed relatively far from the plurality of friction disks 81 and 82.

The first spring holder 71 and the second spring holder 72 may have an inner diameter corresponding to the outer diameter of the first shaft 61 of the output shaft 14.

The first spring holder 71 may have a plurality of first projections 71*a* provided on an outer circumferential surface thereof, and the plurality of first projections 71*a* may be spaced apart from each other on the outer circumferential surface of the first spring holder 71 in a circumferential direction thereof. The plurality of first projections 71*a* may protrude outwards from the outer circumferential surface of the first spring holder 71, and the first projections 71*a* of the first spring holder 71 may be fitted into the inner recesses 12*a* of the housing 12.

The second spring holder 72 may have a plurality of second projections 72*a* provided on an outer circumferential surface thereof, and the plurality of second projections 72*a* may be spaced apart from each other on the outer circumferential surface of the second spring holder 72 in a circumferential direction thereof. The plurality of second projections 72*a* may protrude outwards from the outer circumferential surface of the second spring holder 72, and the second projections 72*a* of the second spring holder 72 may be fitted into the inner recesses 12*a* of the housing 12.

Referring to FIG. 6, the first spring holder 71 may have a first recess 71*c* in which a first end portion of the spring 73 is received, and the second spring holder 72 may have a second recess 72C in which a second end portion of the spring 73 is received. The first spring holder 71 may have a flat surface opposing the first recess 71*c*, and the flat surface of the first spring holder 71 may directly contact the first friction disk 81 located farthest from the flange 63 of the output shaft 14.

The spring 73 may be stably maintained in a compressed state by the first spring holder 71 and the second spring holder 72 in the longitudinal direction of the output shaft 14, and the spring 73 may push the plurality of friction disks 81 and 82 against the flange 63 of the output shaft 14 using the spring force so that the plurality of friction disks 81 and 82 may be stably maintained in a tight contact state between the first spring holder 71 and the flange 63 of the output shaft 14. Thus, the frictional force and the brake torque may be reliably generated between the plurality of friction disks 81 and 82.

The surface roughness of the first friction disk 81, the surface roughness of the second friction disk 82, and a spring constant of the spring 73 may be varied, and accordingly the frictional force and the brake torque generated by the brake unit 16 may be varied or adjusted.

Figure 7:
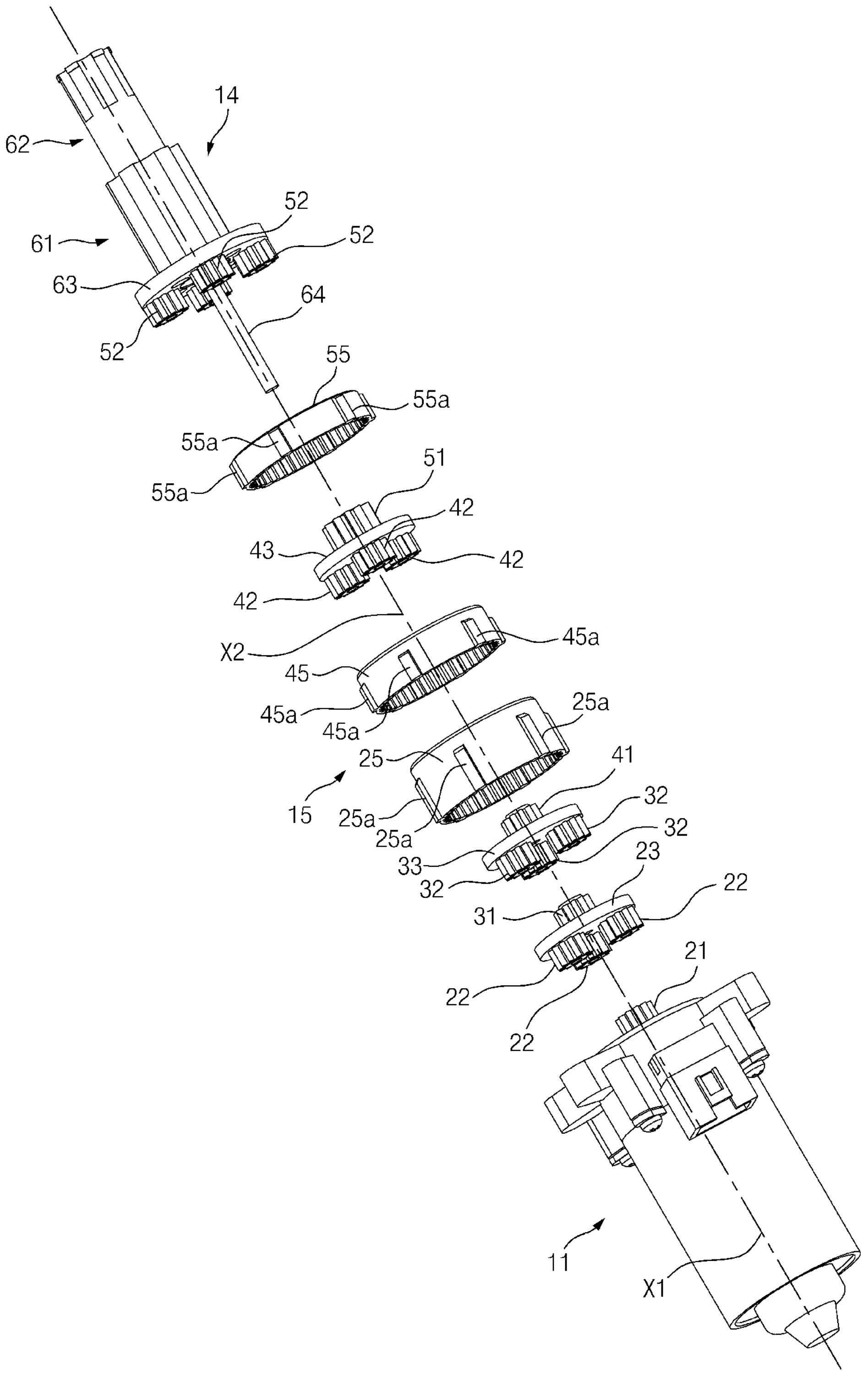
FIG. 7 illustrates an exploded perspective view of an actuator, a transmission mechanism, and an output shaft in a vehicle hinge driving apparatus according to an exemplary embodiment of the present disclosure.
Figure 8:
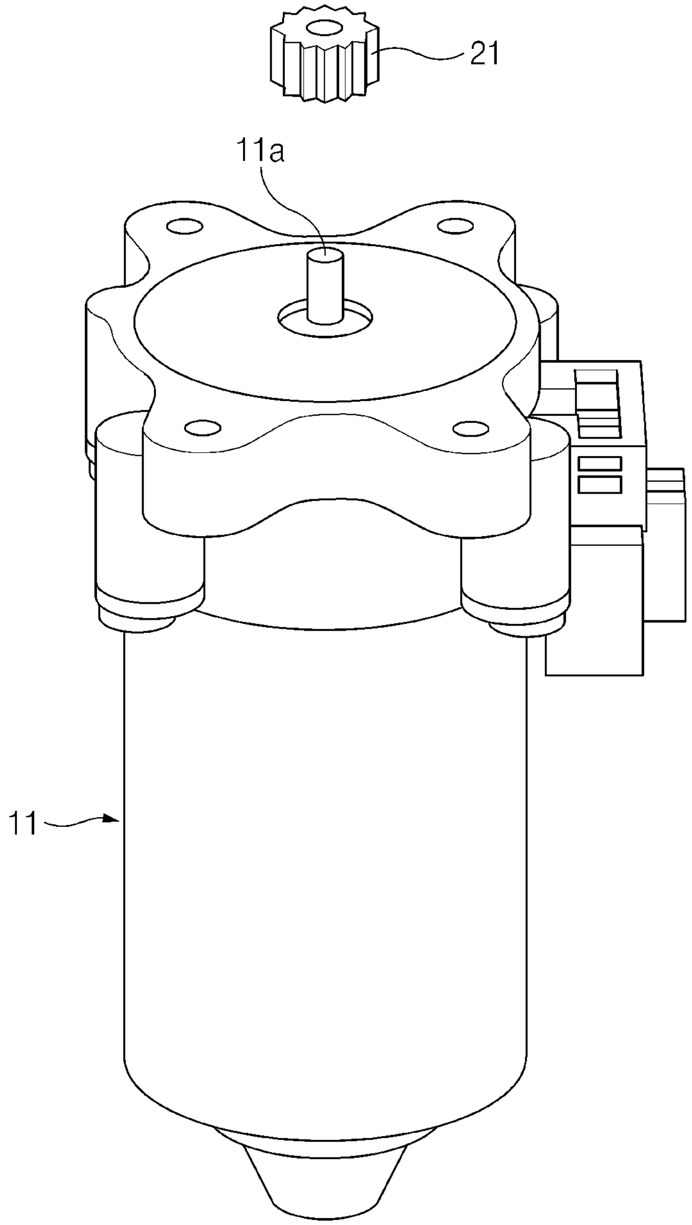
FIG. 8 illustrates an exploded perspective view of an actuator and a proximal sun gear in a vehicle hinge driving apparatus according to an exemplary embodiment of the present disclosure.
Figure 9:
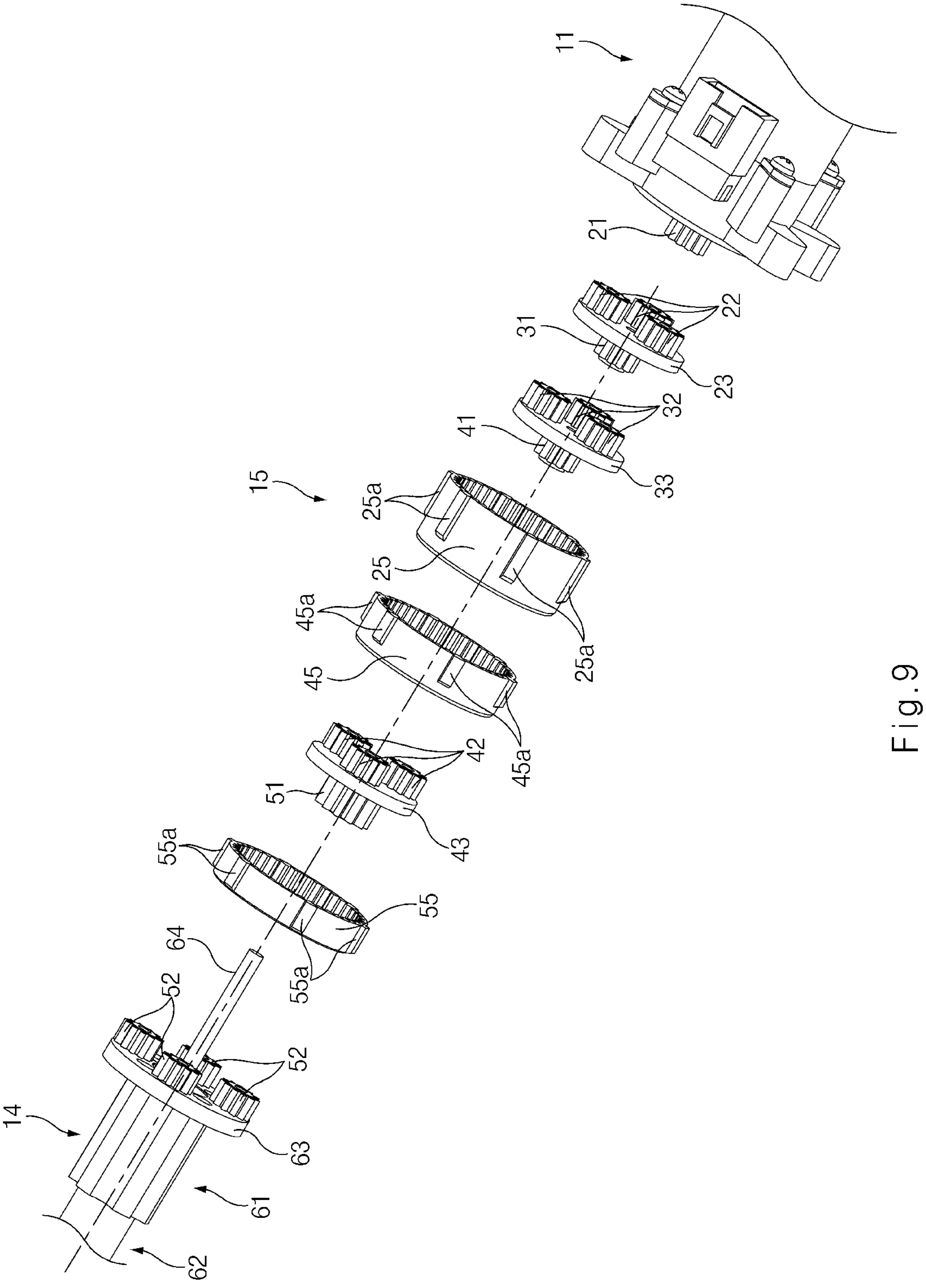
FIG. 9 illustrates an enlarged exploded perspective view of a transmission mechanism of a vehicle hinge driving apparatus according to an exemplary embodiment of the present disclosure.

The transmission mechanism 15 according to the exemplary embodiment illustrated in FIGS. 2, 7, and 9 may include a plurality of gear sets arranged in a line along the axis X2 of the housing 12. The plurality of gear sets may include a proximal gear set closely connected to the actuator 11, and a distal gear set located farthest from the actuator 11. In addition, the plurality of gear sets may further include one or more intermediate gear sets between the proximal gear set and the distal gear set. FIGS. 2, 7, and 9 illustrate two intermediate planetary gear sets disposed between the proximal gear set and the distal gear set. As necessary, the number of intermediate planetary gear sets may be changed or the intermediate planetary gear set may be removed.

Referring to FIGS. 2, 7, and 9, the proximal gear set may be a planetary gear set that is close to the actuator 11, and the distal gear set may be a planetary gear set that is farthest from the actuator 11. A first intermediate gear set and a second intermediate gear set may be disposed between the proximal gear set and the distal gear set. The distal gear set may be close to the output shaft 14, and the distal gear set may connect the output shaft 14 and the second intermediate gear set.

Referring to FIGS. 2, 7, and 9, the transmission mechanism 15 may include the proximal gear set operatively connected to the actuator 11, the first intermediate gear set operatively connected to the proximal gear set, the second intermediate gear set operatively connected to the first intermediate gear set, and the distal gear set operatively connected to the second intermediate gear set. An axis of the proximal gear set, an axis of the first intermediate gear set, an axis of the second intermediate gear set, and an axis of the distal gear set may be aligned with the axis X2 of the housing 12.

The proximal gear set may be a planetary gear set including a proximal sun gear 21 fixed to the actuator shaft 11*a* of the actuator 11, a plurality of proximal planet gears 22 arranged around the proximal sun gear 21, and a proximal carrier 23 holding the plurality of proximal planet gears 22. The plurality of proximal planet gears 22 may mesh with the proximal sun gear 21, and a plurality of pins 22*a* may be fixed to the proximal carrier 23. As each proximal planet gear 22 is rotatably mounted on the corresponding pin 22*a*, the plurality of proximal planet gears 22 may be rotatably held by the proximal carrier 23.

An axis of the proximal carrier 23 may be aligned with the axis X2 of the housing 12. The proximal carrier 23 may have a first surface facing the first open end of the housing 12, and a second surface facing the second open end of the housing 12. Accordingly, the first surface of the proximal carrier 23 may face the actuator 11, and the second surface of the proximal carrier 23 may face the cover 13. The plurality of proximal planet gears 22 may be rotatably mounted on the first surface of the proximal carrier 23, and a first intermediate sun gear 31 may be fixedly mounted on the second surface of the proximal carrier 23.

The first intermediate gear set may be a planetary gear set including the first intermediate sun gear 31 protruding from the proximal carrier 23 toward the output shaft 14, a plurality of first intermediate planet gears 32 arranged around the first intermediate sun gear 31, and a first intermediate carrier 33 holding the plurality of first intermediate planet gears 32.

An axis of the first intermediate sun gear 31 may be aligned with the axis of the proximal carrier 23, and the first intermediate sun gear 31 may be integrally connected to the proximal carrier 23. According to an exemplary embodiment, the first intermediate sun gear 31 and the proximal carrier 23 may be individually manufactured, and the first intermediate sun gear 31 may be fitted into a through hole of the proximal carrier 23 so that the first intermediate sun gear 31 and the proximal carrier 23 may rotate together. According to another exemplary embodiment, the first intermediate sun gear 31 and the proximal carrier 23 may be manufactured as a unitary one-piece structure by casting or the like. Since the first intermediate sun gear 31 and the proximal carrier 23 form a unitary one-piece structure, the first intermediate sun gear 31 and the proximal carrier 23 may rotate together.

The plurality of first intermediate planet gears 32 may mesh with the first intermediate sun gear 31, and a plurality of pins 32*a* may be fixed to the first intermediate carrier 33. As each first intermediate planet gear 32 is rotatably mounted on the corresponding pin 32*a*, the plurality of first intermediate planet gears 32 may be rotatably held by the first intermediate carrier 33.

The plurality of proximal planet gears 22 and the plurality of first intermediate planet gears 32 may mesh with internal teeth of a common ring gear 25. The common ring gear 25 may have a length sufficient to receive the plurality of proximal planet gears 22, the proximal carrier 23, and the plurality of first intermediate planet gears 32. In addition, the common ring gear 25 may also receive the first intermediate carrier 33. The plurality of proximal planet gears 22 and the plurality of first intermediate planet gears 32 may be sufficiently spaced apart from each other within the common ring gear 25 in a longitudinal direction thereof. Accordingly, the proximal sun gear 21, the plurality of proximal planet gears 22, the proximal carrier 23, and a portion of the common ring gear 25 may form the proximal gear set, and the first intermediate sun gear 31, the plurality of first intermediate planet gears 32, the first intermediate carrier 33, and the remaining portion of the common ring gear 25 may form the first intermediate gear set.

An axis of the common ring gear 25 may be aligned with the axis X2 of the housing 12, and an outer circumferential surface of the common ring gear 25 may be fixedly mounted on the inner circumferential surface of the housing 12. Specifically, the common ring gear 25 may have a plurality of projections 25*a* on the outer circumferential surface thereof, and the plurality of projections 25*a* may be spaced apart from each other on the outer circumferential surface of the common ring gear 25 in a circumferential direction thereof. The projections 25*a* of the common ring gear 25 may be fitted into the inner recesses 12*a* of the housing 12, respectively, so that the common ring gear 25 may be prevented from rotating in the housing 12. Accordingly, the common ring gear 25 may be fixed to the inner circumferential surface of the housing 12, and the plurality of proximal planet gears 22 and the plurality of first intermediate planet gears 32 may revolve around the axis X2 of the housing 12 along the internal teeth of the common ring gear 25. Since the proximal gear set and the first intermediate gear set share one common ring gear 25, the number of components may be reduced and the weight thereof may be reduced. In particular, by reducing a gap between the proximal gear set and the first intermediate gear set, the length and volume of the housing 12 may be reduced.

An axis of the first intermediate carrier 33 may be aligned with the axis X2 of the housing 12. The first intermediate carrier 33 may have a first surface facing the first open end of the housing 12, and a second surface facing the second open end of the housing 12. Accordingly, the first surface of the first intermediate carrier 33 may face the actuator 11, and the second surface of the first intermediate carrier 33 may face the cover 13. The plurality of first intermediate planet gears 32 may be rotatably mounted on the first surface of the first intermediate carrier 33, and a second intermediate sun gear 41 may be fixedly mounted on the second surface of the first intermediate carrier 33.

The second intermediate gear set may be a planetary gear set including the second intermediate sun gear 41 protruding from the first intermediate carrier 33 toward the output shaft 14, a plurality of second intermediate planet gears 42 arranged around the second intermediate sun gear 41, a second intermediate carrier 43 holding the plurality of second intermediate planet gears 42, and a second intermediate ring gear 45 meshing with the plurality of second intermediate planet gears 42. The plurality of second intermediate planet gears 42 may mesh with the second intermediate sun gear 41, and a plurality of pins 42*a* may be fixed to the second intermediate carrier 43. As each second intermediate planet gear 42 is rotatably mounted on the corresponding pin 42*a*, the plurality of second intermediate planet gears 42 may be rotatably held by the second intermediate carrier 43. The plurality of second intermediate planet gears 42 may mesh with internal teeth of the second intermediate ring gear 45, and the plurality of second intermediate planet gears 42 may revolve around the axis X2 of the housing 12.

An axis of the second intermediate sun gear 41 may be aligned with the axis of the first intermediate carrier 33, and the second intermediate sun gear 41 may be integrally connected to the first intermediate carrier 33. According to an exemplary embodiment, the second intermediate sun gear 41 and the first intermediate carrier 33 may be individually manufactured, and the second intermediate sun gear 41 may be fitted into a through hole of the first intermediate carrier 33 so that the second intermediate sun gear 41 and the first intermediate carrier 33 may rotate together. According to another exemplary embodiment, the second intermediate sun gear 41 and the first intermediate carrier 33 may be manufactured as a unitary one-piece structure by casting or the like. Since the second intermediate sun gear 41 and the first intermediate carrier 33 form a unitary one-piece structure, the second intermediate sun gear 41 and the first intermediate carrier 33 may rotate together.

An outer circumferential surface of the second intermediate ring gear 45 may be fixedly mounted on the inner circumferential surface of the housing 12. Specifically, the second intermediate ring gear 45 may have a plurality of projections 45*a* on the outer circumferential surface thereof, and the plurality of projections 45*a* may be spaced apart from each other on the outer circumferential surface of the second intermediate ring gear 45 in a circumferential direction thereof. The projections 45*a* of the second intermediate ring gear 45 may be fitted into the inner recesses 12*a* of the housing 12, respectively, so that the second intermediate ring gear 45 may be prevented from rotating in the housing 12. Accordingly, the second intermediate ring gear 45 may be fixed to the inner circumferential surface of the housing 12, and the plurality of second intermediate planet gears 42 may revolve around the axis X2 of the housing 12 along the internal teeth of the second intermediate ring gear 45.

The distal gear set may be a planetary gear set including a distal sun gear 51 protruding from the second intermediate carrier 43 toward the output shaft 14, a plurality of distal planet gears 52 arranged around the distal sun gear 51, and a distal ring gear 55 meshing with the plurality of distal planet gears 52. The plurality of distal planet gears 52 may mesh with the distal sun gear 51, and the plurality of distal planet gears 52 may mesh with internal teeth of the distal ring gear 55. The plurality of distal planet gears 52 may revolve around the axis X2 of the housing 12.

An axis of the distal sun gear 51 may be aligned with the axis of the second intermediate carrier 43, and the distal sun gear 51 may be integrally connected to the second intermediate carrier 43. According to an exemplary embodiment, the distal sun gear 51 and the second intermediate carrier 43 may be individually manufactured, and the distal sun gear 51 may be fitted into a through hole of the second intermediate carrier 43 so that the distal sun gear 51 and the second intermediate carrier 43 may rotate together. According to another exemplary embodiment, the distal sun gear 51 and the second intermediate carrier 43 may be manufactured as a unitary one-piece structure by casting or the like. Since the distal sun gear 51 and the second intermediate carrier 43 form a unitary one-piece structure, the distal sun gear 51 and the second intermediate carrier 43 may rotate together.

An outer circumferential surface of the distal ring gear 55 may be fixedly mounted on the inner circumferential surface of the housing 12. Specifically, the distal ring gear 55 may have a plurality of projections 55*a* on the outer circumferential surface thereof, and the plurality of projections 55*a* may be spaced apart from each other on the outer circumferential surface of the distal ring gear 55 in a circumferential direction thereof. The projections 55*a* of the distal ring gear 55 may be fitted into the inner recesses 12*a* of the housing 12, respectively, so that the distal ring gear 55 may be prevented from rotating in the housing 12. Accordingly, the distal ring gear 55 may be fixed to the inner circumferential surface of the housing 12, and the plurality of distal planet gears 52 may revolve around the axis X2 of the housing 12 along the internal teeth of the distal ring gear 55.

As described above, the projections 25*a* of the common ring gear 25, the projections 45*a* of the second intermediate ring gear 45, and the projections 55*a* of the distal ring gear 55 may be fixedly mounted in the inner recesses 12*a* of the housing 12, and the axis of each of the ring gears 25, 45, and 55 may be accurately aligned with the axis X2 of the housing 12.

The output shaft 14 may include the flange 63 facing the distal planet gears 52 of the distal gear set, and the plurality of pins 65 may be fixed to the flange 63 of the output shaft 14. As each distal planet gear 52 is rotatably mounted on the corresponding pin 65, the plurality of distal planet gears 52 may be rotatably held by the flange 63 of the output shaft 14. Accordingly, the distal gear set may be directly connected to the output shaft 14, and a loss of torque to be transmitted to the output shaft may be minimized.

As the actuator 11 is driven, the proximal sun gear 21 may rotate, and the plurality of proximal planet gears 22 meshing with the proximal sun gear 21 may revolve around the axis X2 of the housing 12 along the internal teeth of the common ring gear 25 so that the proximal carrier 23 and the first intermediate sun gear 31 may rotate together around the axis X2 of the housing 12. For example, a gear ratio of the proximal gear set may be 4.64:1. The proximal carrier 23 and the first intermediate sun gear 31 may increase the torque received from the actuator 11 based on the gear ratio of the proximal gear set.

As the first intermediate sun gear 31 rotates, the plurality of first intermediate planet gears 32 meshing with the first intermediate sun gear 31 may revolve around the axis X2 of the housing 12 along the internal teeth of the common ring gear 25 so that the first intermediate carrier 33 and the second intermediate sun gear 41 may rotate together around the axis X2 of the housing 12. For example, a gear ratio of the first intermediate gear set may be 4.64:1. The first intermediate carrier 33 and the second intermediate sun gear 41 may increase the torque received from the actuator 11 based on the gear ratio of the proximal gear set and the gear ratio of the first intermediate gear set.

As the second intermediate sun gear 41 rotates, the plurality of second intermediate planet gears 42 meshing with the second intermediate sun gear 41 may revolve around the axis X2 of the housing 12 along the internal teeth of the second intermediate ring gear 45 so that the second intermediate carrier 43 and the distal sun gear 51 may rotate together around the axis X2 of the housing 12. For example, a gear ratio of the second intermediate gear set may be 4.64:1. The second intermediate carrier 43 and the distal sun gear 51 may increase the torque received from the actuator 11 based on the gear ratio of the proximal gear set, the gear ratio of the first intermediate gear set, and the gear ratio of the second intermediate gear set.

As the distal sun gear 51 rotates, the plurality of distal planet gears 52 meshing with the distal sun gear 51 may revolve around the axis X2 of the housing 12 along the internal teeth of the distal ring gear 55, and the flange 63 of the output shaft 14 may rotate around the axis X2 of the housing 12. For example, a gear ratio of the distal gear set may be 3.71:1. The flange 63 of the output shaft 14 may increase the torque based on the gear ratio of the proximal gear set, the gear ratio of the first intermediate gear set, the gear ratio of the second intermediate gear set, and the gear ratio of the distal gear set.

As the plurality of planetary gear sets are connected in series along the axis X2 of the housing 12, the torque to be transmitted from the actuator 11 to the output shaft 14 may be increased by the plurality of planetary gear sets.

Referring to FIGS. 7 and 9, the output shaft 14 may include the support pin 64 extending toward the actuator 11. The support pin 64 may be aligned with the axis of the output shaft 14 and the axis X2 of the housing 12, and the support pin 64 may allow the axis of the transmission mechanism 15 to be aligned with the axis X2 of the housing 12. The plurality of carriers 23, 33, and 43 and the plurality of sun gears 31, 41, and 51 may be rotatably supported by the support pin 64, and accordingly the axis of each of the carriers 23, 33, and 43 and the axis of each of the sun gears 31, 41, and 51 may be accurately aligned with the axis X2 of the housing 12 through the support pin 64. Thus, the concentricity of the carriers 23, 33, and 43 and the sun gears 31, 41, and 51 may be achieved, and vibration reduction and noise reduction of the gear sets may be obtained. Specifically, the support pin 64 may extend through the center through hole of the proximal carrier 23, the center through hole of the first intermediate sun gear 31, the center through hole of the first intermediate carrier 33, the center through hole of the second intermediate sun gear 41, the center through hole of the second intermediate carrier 43, and the center through hole of the distal sun gear 51, and accordingly the proximal carrier 23, the first intermediate sun gear 31, the first intermediate carrier 33, the second intermediate sun gear 41, the second intermediate carrier 43, and the distal sun gear 51 may be rotatably supported by the support pin 64.

Referring to FIG. 1, the axis X of the hinge pin 4 of the vehicle hinge 1 may be aligned with the axis X2 of the housing 12, and the axis X1 of the actuator 11 may be aligned with the axis X2 of the housing 12. According to an exemplary embodiment of the present disclosure, the axis X2 of the housing 12 and the axis X1 of the actuator 11 may be aligned so that the vehicle hinge driving apparatus 10 may form a coaxial structure. The vehicle hinge driving apparatus 10 may be coaxially aligned with the axis X of the hinge pin 4 of the vehicle hinge 1.

Figure 12:
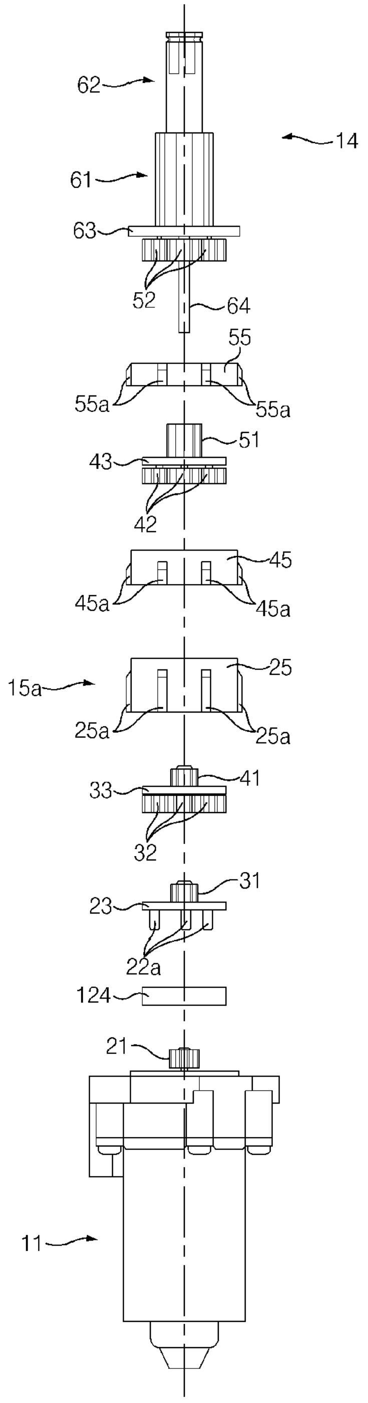
FIG. 12 illustrates a transmission mechanism of a vehicle hinge driving apparatus according to another exemplary embodiment of the present disclosure.

FIG. 12 illustrates a transmission mechanism 15*a* of a vehicle hinge driving apparatus according to another exemplary embodiment of the present disclosure. Referring to FIG. 12, the transmission mechanism 15*a* in the vehicle hinge driving apparatus according to another exemplary embodiment may include a dummy plate 124 detachably provided to replace at least one planetary gear set among the plurality of planetary gear sets.

Referring to FIG. 12, compared with the transmission mechanism 15 according to the exemplary embodiment illustrated in FIGS. 7 and 9, the plurality of proximal planet gears 22 may be detached from the proximal carrier 23 of the proximal gear set, and the dummy plate 124 may be detachably coupled to the proximal carrier 23 and the proximal sun gear 21. In addition, the first intermediate gear set, the second intermediate gear set, and the distal gear set in the transmission mechanism 15 may be maintained as they are in the transmission mechanism 15*a*.

The dummy plate 124 may be disposed between the actuator 11 and the plurality of planetary gear sets, and the dummy plate 124 may transmit a torque (power) generated by the actuator 11 to an adjacent planetary gear set at a ratio of 1:1 without any changes in the torque and RPM (the number of turns), and accordingly an output torque of the vehicle hinge driving apparatus including the transmission mechanism 15*a* according to the exemplary embodiment illustrated in FIG. 12 may be relatively reduced compared to that of the vehicle hinge driving apparatus including the transmission mechanism 15 according to the exemplary embodiment illustrated in FIGS. 7 and 9. For example, an output torque of approximately 100 N·m may be required to drive a relatively heavy door component (e.g., 15 kg or more) such as a trunk lid or a door of a medium/large sized vehicle, and the transmission mechanism 15 according to the exemplary embodiment illustrated in FIGS. 7 and 9 may be able to transmit a relatively high output torque (maximum 100 N·m) to the output shaft 14 through the four planetary gear sets. Meanwhile, an output torque of approximately 20 N·m may be required to drive a relatively light door component (e.g., less than 15 kg) such as a trunk lid or a door of a small sized vehicle, and the transmission mechanism 15*a* according to the exemplary embodiment illustrated in FIG. 12 may be able to transmit a relatively low output torque (maximum 20 N·m) to the output shaft 14 through the three planetary gear sets and the dummy plate 124.

As the dummy plate 124 is selectively mounted, the number of planetary gear sets may be adjusted, and thus the output torque of the vehicle hinge driving apparatus may be varied accordingly.

Figure 13:
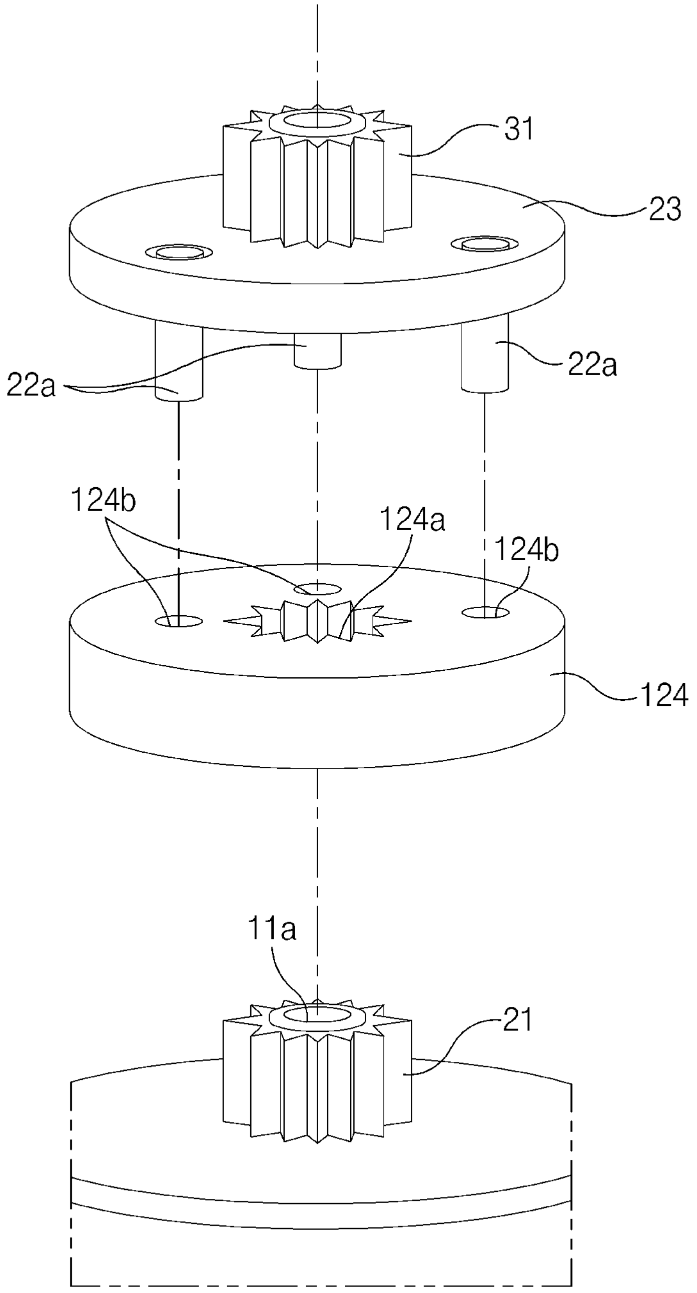
FIG. 13 illustrates an exploded perspective view of a dummy plate, a proximal sun gear, and a proximal carrier in a transmission mechanism of a vehicle hinge driving apparatus according to another exemplary embodiment of the present disclosure.
Figure 14:
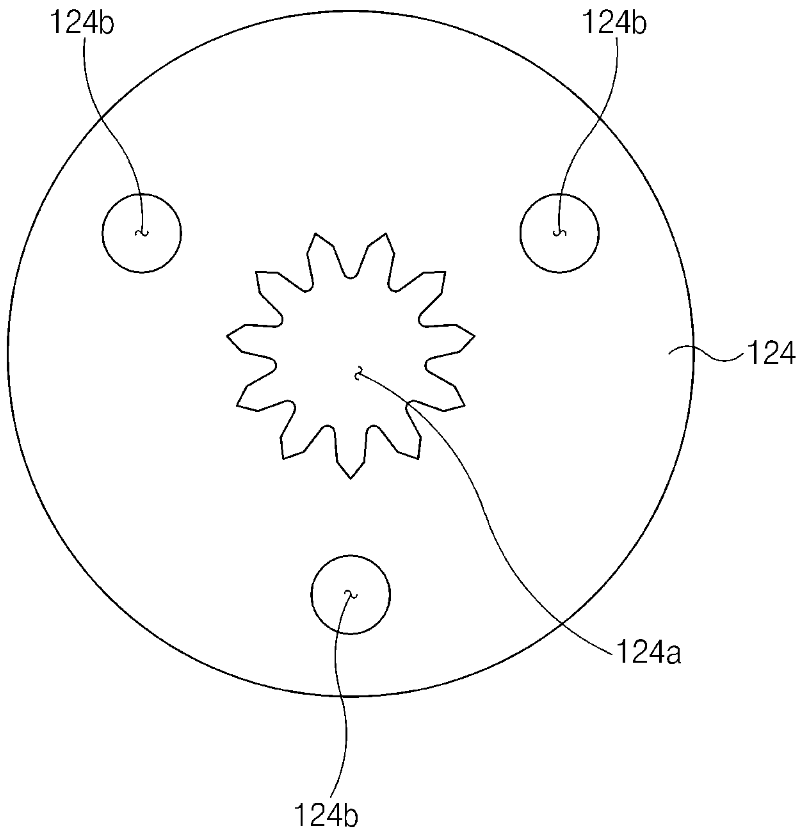
FIG. 14 illustrates the dummy plate illustrated in FIG. 13.

Referring to FIGS. 13 and 14, the dummy plate 124 may include a first hole 124*a* into which the proximal sun gear 21 is fit, and a plurality of second holes 124*b* into which the plurality of pins 22*a* are fit, respectively.

The first hole 124*a* may have internal teeth fitting external teeth of the proximal sun gear 21, and accordingly the proximal sun gear 21 may be firmly fit into the first hole 124*a*.

Each second hole 124*b* may have an inner diameter which is the same as an outer diameter of the pin 22*a*, and accordingly each pin 22*a* may be firmly fit into the corresponding second hole 124*b*.

The dummy plate 124 may connect the proximal sun gear 21 and the plurality of pins 22*a*. As the actuator shaft 11*a* of the actuator 11 rotates, the dummy plate 124 may rotate together with the proximal sun gear 21 in the same direction. That is, the dummy plate 124 may transmit the torque generated by the actuator 11 to the first intermediate gear set at a ratio of 1:1 between the actuator shaft 11*a* of the actuator 11 and the first intermediate gear set without any changes in the torque and RPM (the number of turns). Since the proximal gear set is removed, the output torque of the vehicle hinge driving apparatus including the transmission mechanism 15*a* according to the exemplary embodiment illustrated in FIG. 12 may be relatively reduced compared to that of the vehicle hinge driving apparatus including the transmission mechanism 15 according to the exemplary embodiment illustrated in FIGS. 7 and 9. That is, the output torque may be varied through the selective mounting of the dummy plate 124.

Figure 15:
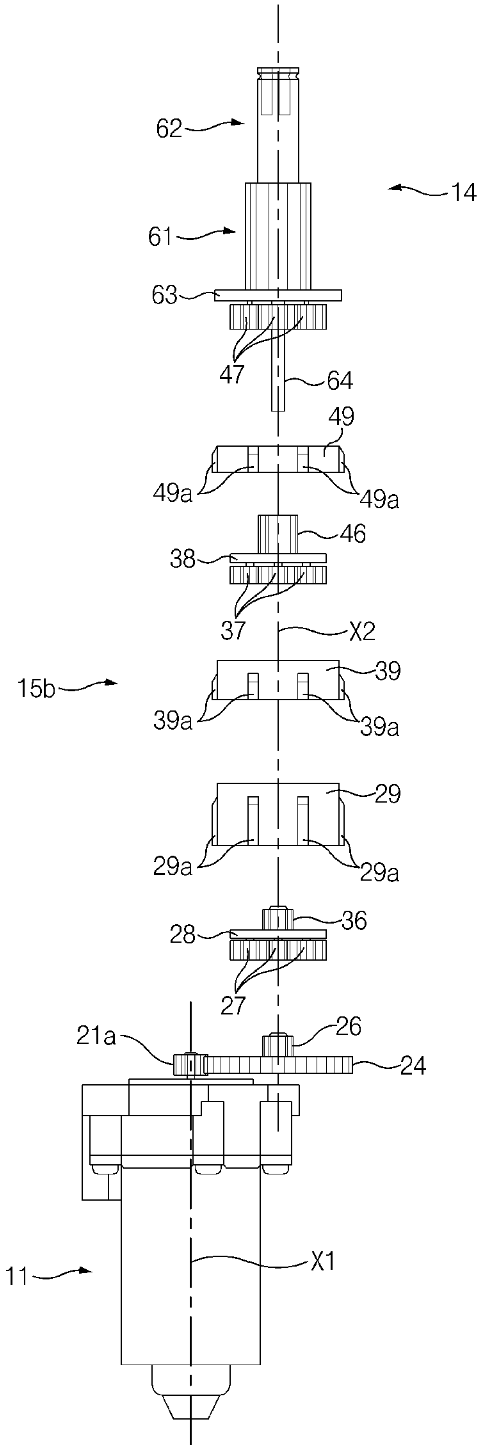
FIG. 15 illustrates a transmission mechanism of a vehicle hinge driving apparatus according to another exemplary embodiment of the present disclosure.

FIG. 15 illustrates a transmission mechanism 15*b* of a vehicle hinge driving apparatus according to another exemplary embodiment of the present disclosure. Referring to FIG. 15, the axis X of the hinge pin 4 of the vehicle hinge 1 may be aligned with the axis X2 of the housing 12, and the axis X1 of the actuator 11 may be parallel to and be offset to the axis X2 of the housing 12. As the axis X2 of the housing 12 is offset with respect to the axis X1 of the actuator 11, the vehicle hinge driving apparatus may form a multi-axial structure.

Referring to FIG. 15, the transmission mechanism 15*b* according to another exemplary embodiment may include a proximal gear set operatively connected to the actuator 11, a first intermediate gear set operatively connected to the proximal gear set, a second intermediate gear set operatively connected to the first intermediate gear set, and a distal gear set operatively connected to the second intermediate gear set.

Figure 16:
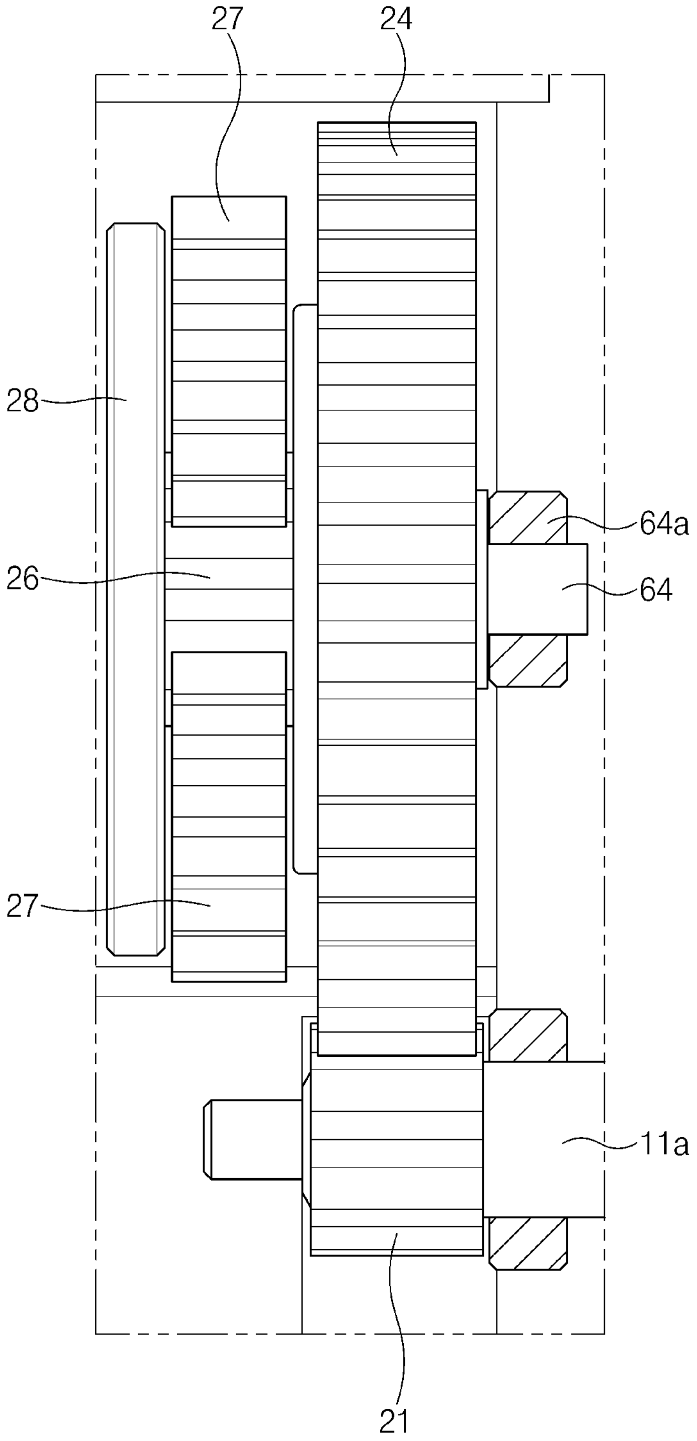
FIG. 16 illustrates a spur gear set of the transmission mechanism illustrated in FIG. 15.

Referring to FIG. 16, the proximal gear set may be a spur gear set including a first spur gear 21*a* mounted on the actuator shaft 11*a* of the actuator 11, and a second spur gear 24 meshing with the first spur gear 21*a*. The first spur gear 21*a* may be a drive gear, and the second spur gear 24 may be a driven gear which is rotated by the first spur gear 21*a*. A diameter of the second spur gear 24 may be greater than that of the first spur gear 21*a*. In addition, the number of teeth of the second spur gear 24 may be greater than the number of teeth of the first spur gear 21*a*. The spur gear set may have a predetermined gear ratio, and a torque transmitted from the actuator 11 to the output shaft 14 may increase based on the gear ratio of the spur gear set. An axis of the first spur gear 21*a* may be aligned with the axis X1 of the actuator 11, and an axis of the second spur gear 24 may be aligned with the axis X2 of the housing 12. As the axis of the first spur gear 21*a* is offset with respect to the axis of the second spur gear 24, the axis X1 of the actuator 11 may be offset with respect to the axis X2 of the housing 12.

The support pin 64 of the output shaft 14 may extend through a center through hole of the second spur gear 24, and an end portion of the support pin 64 protruding from the second spur gear 24 may be supported by bearing or bushing 64*a*.

The first intermediate gear set may include a first intermediate sun gear 26 protruding from the second spur gear 24, a plurality of first intermediate planet gears 27 arranged around the first intermediate sun gear 26, a first intermediate carrier 28 holding the plurality of first intermediate planet gears 27, and a first intermediate ring gear 29 meshing with the plurality of first intermediate planet gears 27. The plurality of first intermediate planet gears 27 may mesh with the first intermediate sun gear 26, and the plurality of first intermediate planet gears 27 may be rotatably held by the first intermediate carrier 28. The plurality of first intermediate planet gears 27 may mesh with internal teeth of the first intermediate ring gear 29, and the plurality of first intermediate planet gears 27 may revolve around the axis X2 of the housing 12.

An outer circumferential surface of the first intermediate ring gear 29 may be fixedly mounted on the inner circumferential surface of the housing 12. Specifically, the first intermediate ring gear 29 may have a plurality of projections 29*a* on the outer circumferential surface thereof, and the plurality of projections 29*a* may be spaced apart from each other on the outer circumferential surface of the first intermediate ring gear 29 in a circumferential direction thereof. The projections 29*a* of the first intermediate ring gear 29 may be fitted into the inner recesses 12*a* of the housing 12, respectively, so that the first intermediate ring gear 29 may be prevented from rotating in the housing 12. Accordingly, the first intermediate ring gear 29 may be fixed to the inner circumferential surface of the housing 12, and the plurality of first intermediate planet gears 27 may revolve around the axis X2 of the housing 12 along the internal teeth of the first intermediate ring gear 29.

The second intermediate gear set may include a second intermediate sun gear 36 protruding from the first intermediate carrier 28, a plurality of second intermediate planet gears 37 arranged around the second intermediate sun gear 36, a second intermediate carrier 38 holding the plurality of second intermediate planet gears 37, and a second intermediate ring gear 39 meshing with the plurality of second intermediate planet gears 37. The plurality of second intermediate planet gears 37 may mesh with the second intermediate sun gear 36, and the plurality of second intermediate planet gears 37 may be rotatably held by the second intermediate carrier 38. The plurality of second intermediate planet gears 37 may mesh with internal teeth of the second intermediate ring gear 39, and the plurality of second intermediate planet gears 37 may revolve around the axis X2 of the housing 12.

An outer circumferential surface of the second intermediate ring gear 39 may be fixedly mounted on the inner circumferential surface of the housing 12. Specifically, the second intermediate ring gear 39 may have a plurality of projections 39*a* on the outer circumferential surface thereof, and the plurality of projections 39*a* may be spaced apart from each other on the outer circumferential surface of the second intermediate ring gear 39 in a circumferential direction thereof. The projections 39*a* of the second intermediate ring gear 39 may be fitted into the inner recesses 12*a* of the housing 12, respectively, so that the second intermediate ring gear 39 may be prevented from rotating in the housing 12. Accordingly, the second intermediate ring gear 39 may be fixed to the inner circumferential surface of the housing 12, and the plurality of second intermediate planet gears 37 may revolve around the axis X2 of the housing 12 along the internal teeth of the second intermediate ring gear 39.

The distal gear set may include a distal sun gear 46 protruding from the second intermediate carrier 38, a plurality of distal planet gears 47 arranged around the distal sun gear 46, and a distal ring gear 49 meshing with the plurality of distal planet gears 47. The plurality of distal planet gears 47 may mesh with the distal sun gear 46, and the plurality of distal planet gears 47 may be rotatably held by the flange 63 of the output shaft 14 through a plurality of pins (not shown). The plurality of distal planet gears 47 may mesh with internal teeth of the distal ring gear 49, and the plurality of distal planet gears 47 may revolve around the axis X2 of the housing 12.

An outer circumferential surface of the distal ring gear 49 may be fixedly mounted on the inner circumferential surface of the housing 12. Specifically, the distal ring gear 49 may have a plurality of projections 49*a* on the outer circumferential surface thereof, and the plurality of projections 49*a* may be spaced apart from each other on the outer circumferential surface of the distal ring gear 49 in a circumferential direction thereof. The projections 49*a* of the distal ring gear 49 may be fitted into the inner recesses 12*a* of the housing 12, respectively, so that the distal ring gear 49 may be prevented from rotating in the housing 12. Accordingly, the distal ring gear 49 may be fixed to the inner circumferential surface of the housing 12, and the plurality of distal planet gears 47 may revolve around the axis X2 of the housing 12 along the internal teeth of the distal ring gear 49.

The support pin 64 of the output shaft 14 may extend through a center through hole of the second spur gear 24, a center through hole of the first intermediate sun gear 26, a center through hole of the first intermediate carrier 28, a center through hole of the second intermediate sun gear 36, a center through hole of the second intermediate carrier 38, and a center through hole of the distal sun gear 46, and accordingly the second spur gear 24, the first intermediate sun gear 26, the first intermediate carrier 28, the second intermediate sun gear 36, the second intermediate carrier 38, and the distal sun gear 46 may be rotatably supported by the support pin 64.

As set forth above, the vehicle hinge driving apparatus according to exemplary embodiments of the present disclosure may be provided with the brake unit so that the brake torque may be generated while the output shaft is rotating. As the brake torque is provided to the output shaft, the open state of the door component connected to the output shaft through the vehicle hinge may be stably maintained by the brake torque. When the door component is opened, the brake unit may provide the brake torque to the output shaft, and thus the door component may be prevented from being closed by its own weight.

In particular, the surface roughness of the first friction disk, the surface roughness of the second friction disk, and the spring constant of the spring may be varied, and accordingly the frictional force and the brake torque generated by the brake unit may be varied or adjusted.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle hinge driving apparatus, the apparatus comprising:
- an actuator;
- a housing connected to the actuator;
- an output shaft having an axis aligned with an axis of the housing;
- a transmission mechanism configured to transmit a torque from the actuator to the output shaft; and
- a brake unit configured to provide a brake torque to the output shaft, wherein the brake unit comprises a first friction disk mounted on the output shaft, a second friction disk mounted on the housing, wherein the first friction disk contacts the second friction disk, and a spring configured to provide a spring force to maintain contact between the first friction disk and the second friction disk;
- wherein the spring is held on the output shaft by a first spring holder and a second spring holder, wherein the first spring holder is adjacent to the first friction disk and the second friction disk;
- wherein the second spring holder is spaced away from the first friction disk and the second friction disk; and
- wherein the spring is interposed between the first spring holder and the second spring holder.

2. The apparatus according to claim 1, wherein:
- the output shaft comprises a flange facing the transmission mechanism; and
- the spring is configured to apply the spring force to push the first friction disk and the second friction disk against the flange of the output shaft.

3. The apparatus according to claim 1, wherein:
- the housing has a plurality of inner recesses provided in an inner circumferential surface thereof;
- the first spring holder has a plurality of first projections provided on an outer circumferential surface thereof;
- the second spring holder has a plurality of second projections provided on an outer circumferential surface thereof;
- the first projections of the first spring holder are fitted into the inner recesses of the housing, respectively; and
- the second projections of the second spring holder are fitted into the inner recesses of the housing, respectively.

4. The apparatus according to claim 1, wherein the first friction disk and the second friction disk comprise different materials.

5. The apparatus according to claim 1, wherein:
- the output shaft has a plurality of first projections and a plurality of first recesses alternately arranged in a circumferential direction thereof;
- the first friction disk has a plurality of first recesses and a plurality of first projections alternately arranged on an inner circumferential surface thereof;
- the first projections of the first friction disk are fitted into the first recesses of the output shaft, respectively; and
- the first projections of the output shaft are fitted into the first recesses of the first friction disk, respectively.

6. The apparatus according to claim 1, wherein:
- the housing has a plurality of inner recesses provided in an inner circumferential surface thereof;
- the second friction disk has a plurality of second projections provided on an outer circumferential surface thereof; and
- the plurality of second projections of the second friction disk are fitted into the plurality of inner recesses of the housing, respectively.

7. The apparatus according to claim 1, further comprising a hinge rod connected to the output shaft, wherein the hinge rod extends in a direction perpendicular to the axis of the output shaft.

8. The apparatus according to claim 7, wherein:
- the hinge rod includes a through hole through which the output shaft extends;
- the hinge rod has a plurality of recesses and a plurality of projections alternately arranged on an inner circumferential surface of the through hole in a circumferential direction thereof;
- the output shaft has a plurality of second projections and a plurality of second recesses alternately arranged in a circumferential direction thereof;
- the second projections of the output shaft are fitted into the recesses of the hinge rod, respectively; and
- the projections of the hinge rod are fitted into the second recesses of the output shaft, respectively.

9. The apparatus according to claim 8, wherein:
- the output shaft has an annular recess extending in the circumferential direction thereof; and
- the annular recess is provided in the second projections of the output shaft in the circumferential direction.

10. A vehicle hinge driving apparatus, the apparatus comprising:
- an actuator;
- a housing connected to the actuator;
- an output shaft having an axis aligned with an axis of the housing;
- a transmission mechanism configured to transmit a torque from the actuator to the output shaft;
- a brake unit configured to provide a brake torque to the output shaft, wherein the brake unit comprises a first friction disk mounted on the output shaft and a second friction disk mounted on the housing, the first friction disk contacting the second friction disk; and
- a hinge rod connected to the output shaft, wherein the hinge rod extends in a direction perpendicular to the axis of the output shaft;
- wherein the hinge rod includes a through hole through which the output shaft extends;
- wherein the hinge rod has a plurality of recesses and a plurality of projections alternately arranged on an inner circumferential surface of the through hole in a circumferential direction thereof;
- wherein the output shaft has a plurality of second projections and a plurality of second recesses alternately arranged in a circumferential direction thereof;
- wherein the second projections of the output shaft are fitted into the recesses of the hinge rod, respectively; and
- wherein the projections of the hinge rod are fitted into the second recesses of the output shaft, respectively.

11. The apparatus according to claim 10, wherein:
- the output shaft has an annular recess extending in the circumferential direction thereof; and
- the annular recess is provided in the second projections of the output shaft in the circumferential direction.

12. The apparatus according to claim 10, wherein the first friction disk and the second friction disk comprise different materials.

13. A method of providing a vehicle hinge driving apparatus, the method comprising:

connecting a housing to an actuator;

providing an output shaft having an axis aligned with an axis of the housing;

providing a transmission mechanism that transmits a torque from the actuator to the output shaft; and providing a brake unit that provides a brake torque to the output shaft;

wherein the brake unit comprises a first friction disk mounted on the output shaft, a second friction disk mounted on the housing, a spring configured to provide a spring force to maintain contact between the first friction disk and the second friction disk;

wherein the first friction disk contacts the second friction disk;

wherein the spring is held on the output shaft by a first spring holder and a second spring holder;

wherein the first spring holder is adjacent to the first friction disk and the second friction disk;

wherein the second spring holder is spaced away from the first friction disk and the second friction disk; and wherein the spring is interposed between the first spring holder and the second spring holder.

14. The method according to claim 13, wherein:

the output shaft comprises a flange facing the transmission mechanism; and the spring applies the spring force to push the first friction disk and the second friction disk against the flange of the output shaft.

15. The method according to claim 13, wherein:

the housing has a plurality of inner recesses provided in an inner circumferential surface thereof;

the first spring holder has a plurality of first projections provided on an outer circumferential surface thereof;

the second spring holder has a plurality of second projections provided on an outer circumferential surface thereof;

the first projections of the first spring holder are fitted into the inner recesses of the housing, respectively; and the second projections of the second spring holder are fitted into the inner recesses of the housing, respectively.

16. The method according to claim 13, wherein the first friction disk and the second friction disk comprise different materials.

17. The method according to claim 13, wherein:

the output shaft has a plurality of first projections and a plurality of first recesses alternately arranged in a circumferential direction thereof;

the first friction disk has a plurality of first recesses and a plurality of first projections alternately arranged on an inner circumferential surface thereof;

the first projections of the first friction disk are fitted into the first recesses of the output shaft, respectively; and the first projections of the output shaft are fitted into the first recesses of the first friction disk, respectively.

* * * * *